United States Patent [19]

Amberg et al.

[11] 4,090,905
[45] May 23, 1978

[54] METHOD FOR FABRICATING THERMOPLASTIC CONTAINERS

[75] Inventors: Stephen W. Amberg, Toledo, Ohio; Ralph G. Amberg, Monticello, Ind.

[73] Assignee: Owens-Illinois, Inc., Toledo, Ohio

[21] Appl. No.: 681,854

[22] Filed: Apr. 30, 1976

Related U.S. Application Data

[62] Division of Ser. No. 418,612, Nov. 23, 1973, abandoned.

[51] Int. Cl.² .................. B29D 23/10; B29C 27/02
[52] U.S. Cl. .................. 156/218; 93/94 R; 156/285; 156/446; 156/497
[58] Field of Search .................. 156/86, 184, 203, 218, 156/446, 447, 497, 567, 285; 93/81 R, 94 R

[56] References Cited

U.S. PATENT DOCUMENTS

| | | | |
|---|---|---|---|
| 3,056,339 | 10/1962 | Sommerfeld et al. | 156/203 |
| 3,376,181 | 4/1968 | Larson et al. | 156/466 |
| 3,580,788 | 5/1971 | Gustafson | 156/203 |
| 3,884,746 | 5/1975 | Loliger et al. | 156/203 |
| 3,914,152 | 10/1975 | Amberg et al. | 156/567 |
| 3,969,173 | 7/1976 | Amberg et al. | 156/466 |
| 3,970,492 | 7/1976 | Amberg et al. | 156/218 |

Primary Examiner—William A. Powell
Assistant Examiner—Thomas Bokan
Attorney, Agent, or Firm—Myron E. Click; Harold F. Mensing

[57] ABSTRACT

A cup or other nestable container is formed from two continuous web stocks of thermoplastic material, particularly an expanded thermoplastic material. A rectangular blank to form the sidewall of the container is severed from a first web stock, and formed into a cylindrical sleeve with the end portions thereof joined to one another in a liquid-tight seam extending the full height thereof. A circular bottom closure disc is cut from a second web stock and transferred to a recessed top of a forming mandrel carried on a continuously-moving turret. The cylindrical sleeve is positioned about the forming mandrel, which carries the sleeve and bottom closure disc to various subassemblies that cooperate with the forming mandrel to produce a finished cup. The cylindrical sleeve is forced downwardly into a heated rimming die positioned adjacent the lower edge of the forming mandrel to cause the lower edge of the sleeve to be rimmed. The cylindrical sleeve is shrunken to conform to the side contour of the forming mandrel, and the upper end of the sleeve extends inwardly to provide an inturned position overlying the periphery of the bottom closure disc. The bottom closure disc and inturned portion are sealingly joined and contoured to finish the bottom of the container.

3 Claims, 30 Drawing Figures

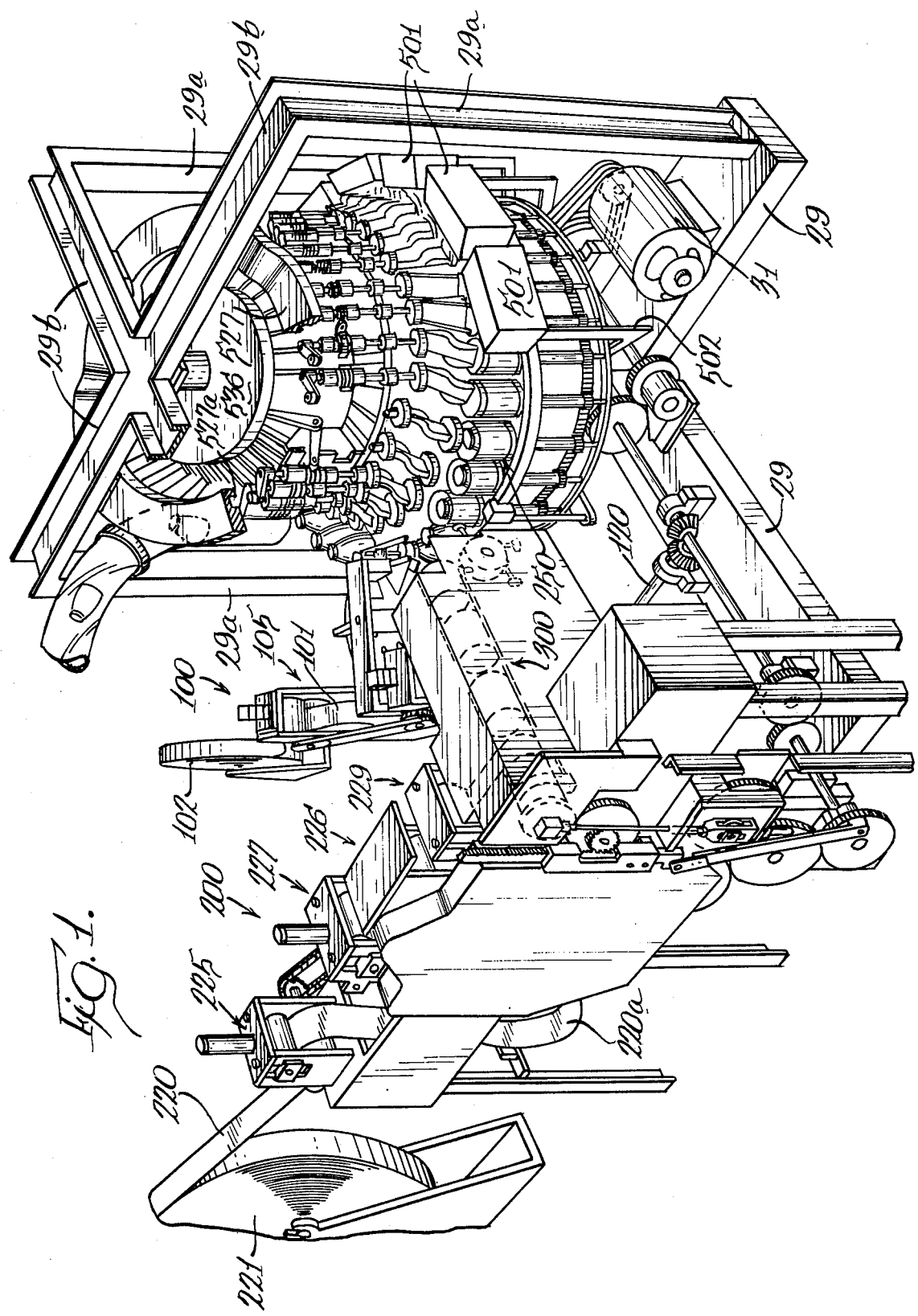

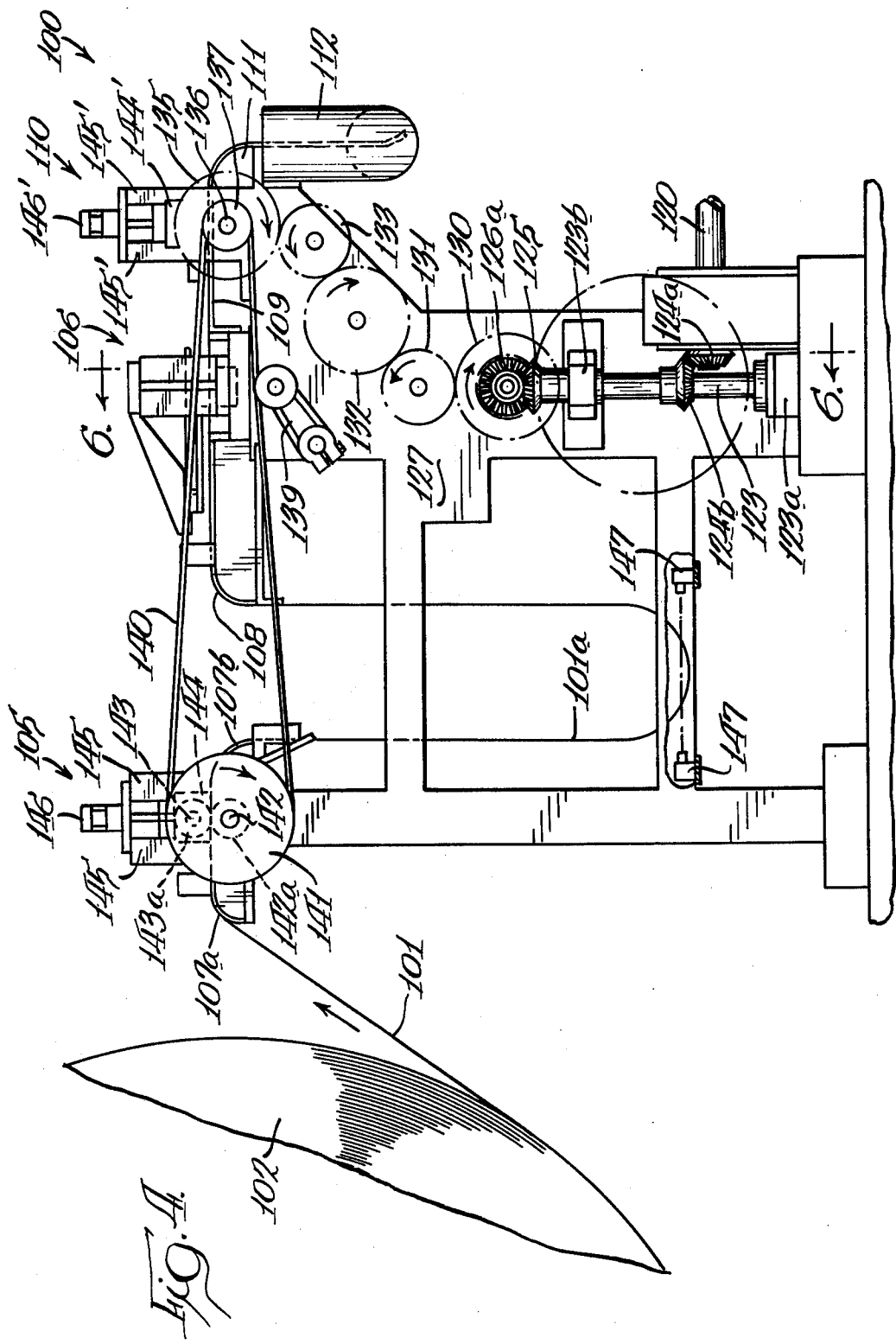

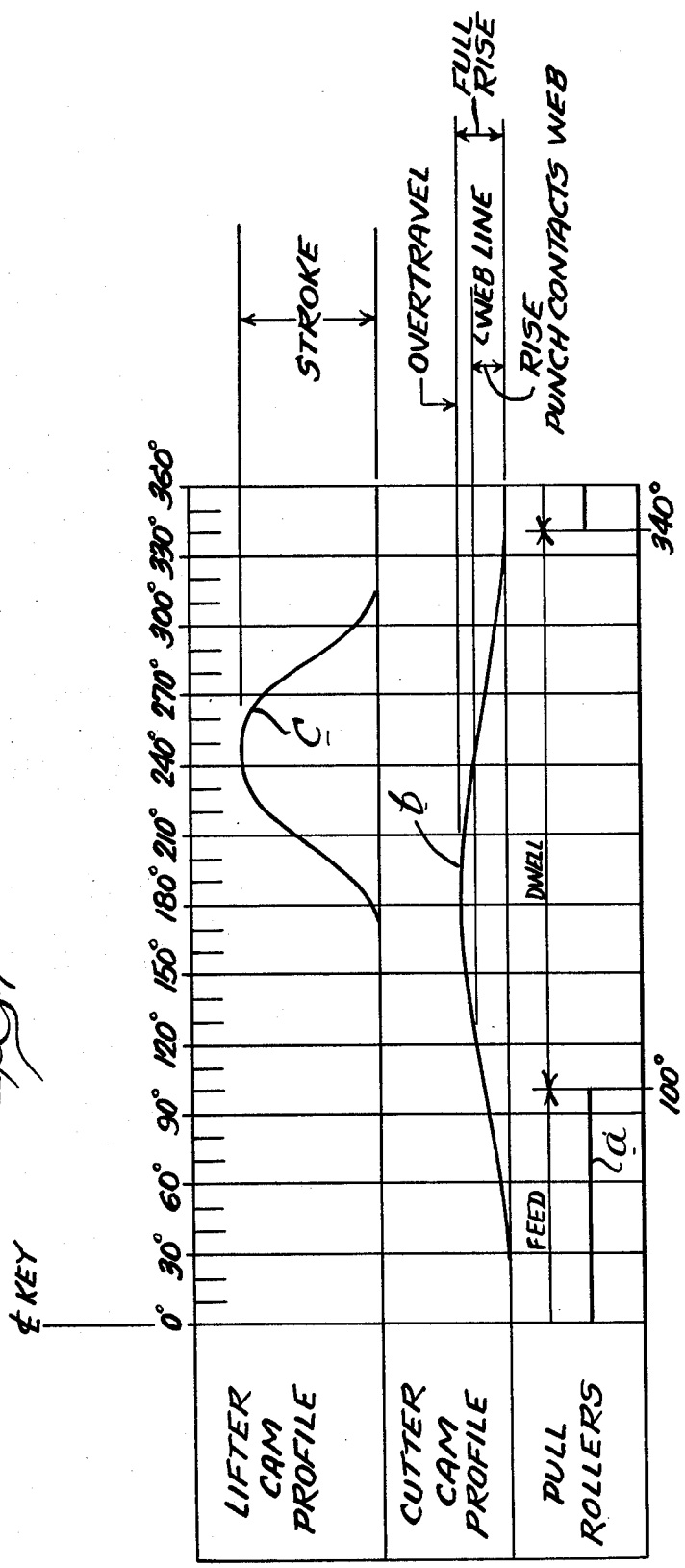

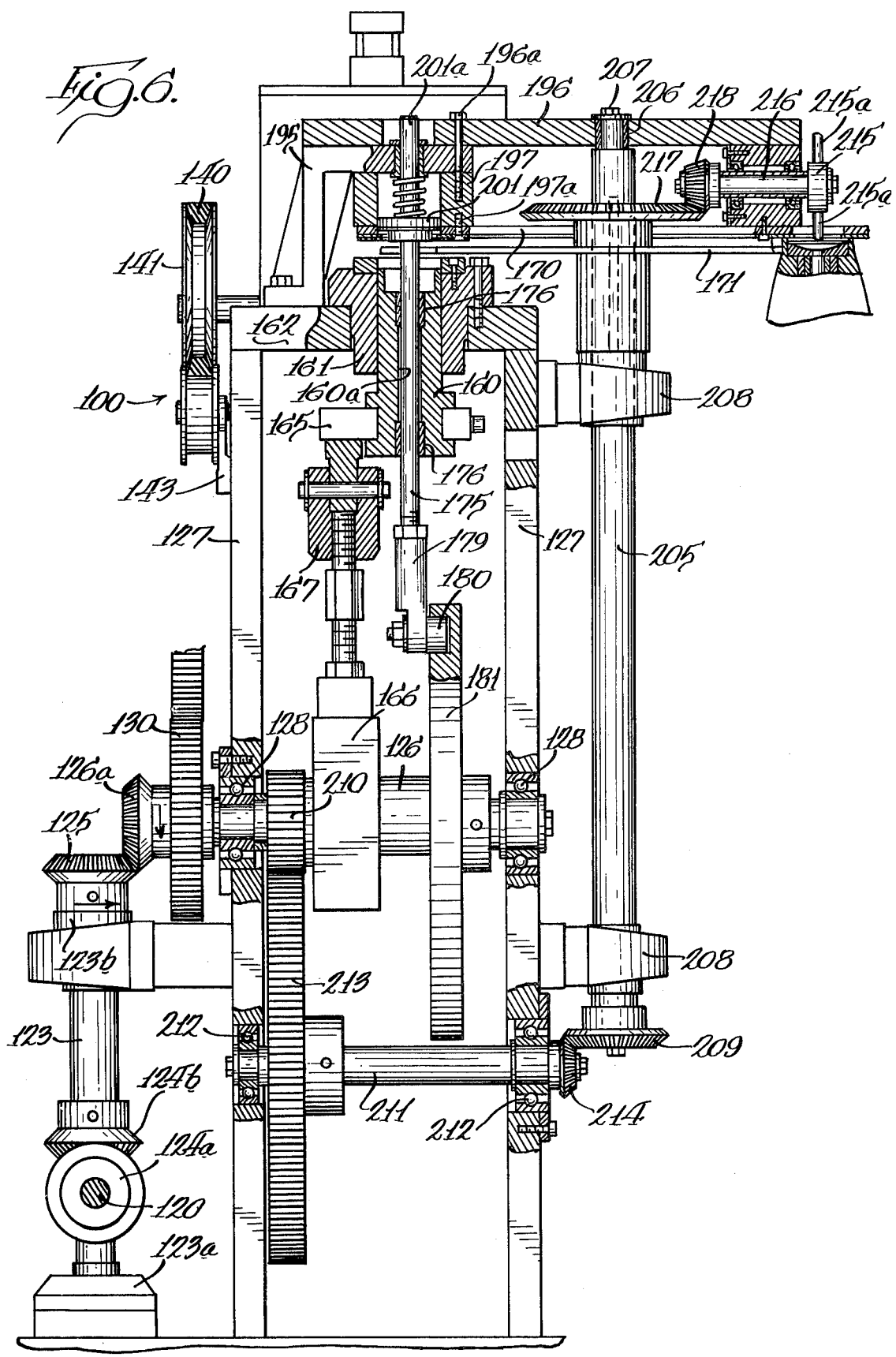

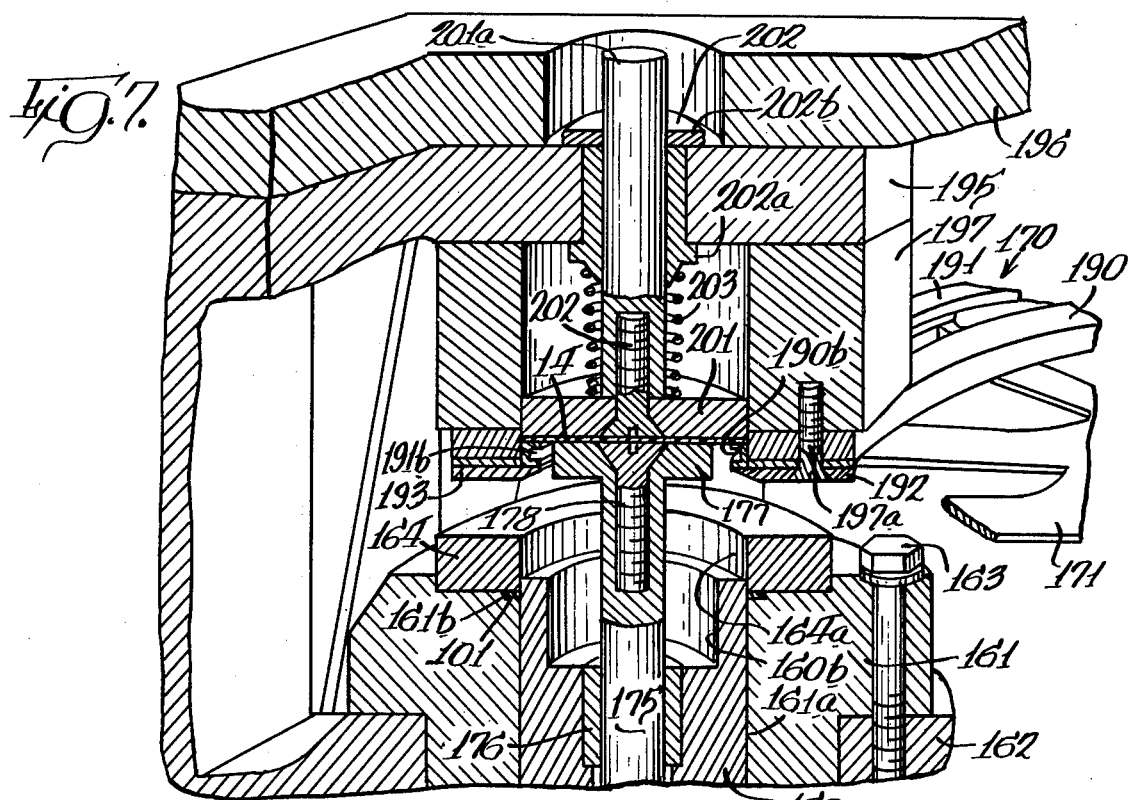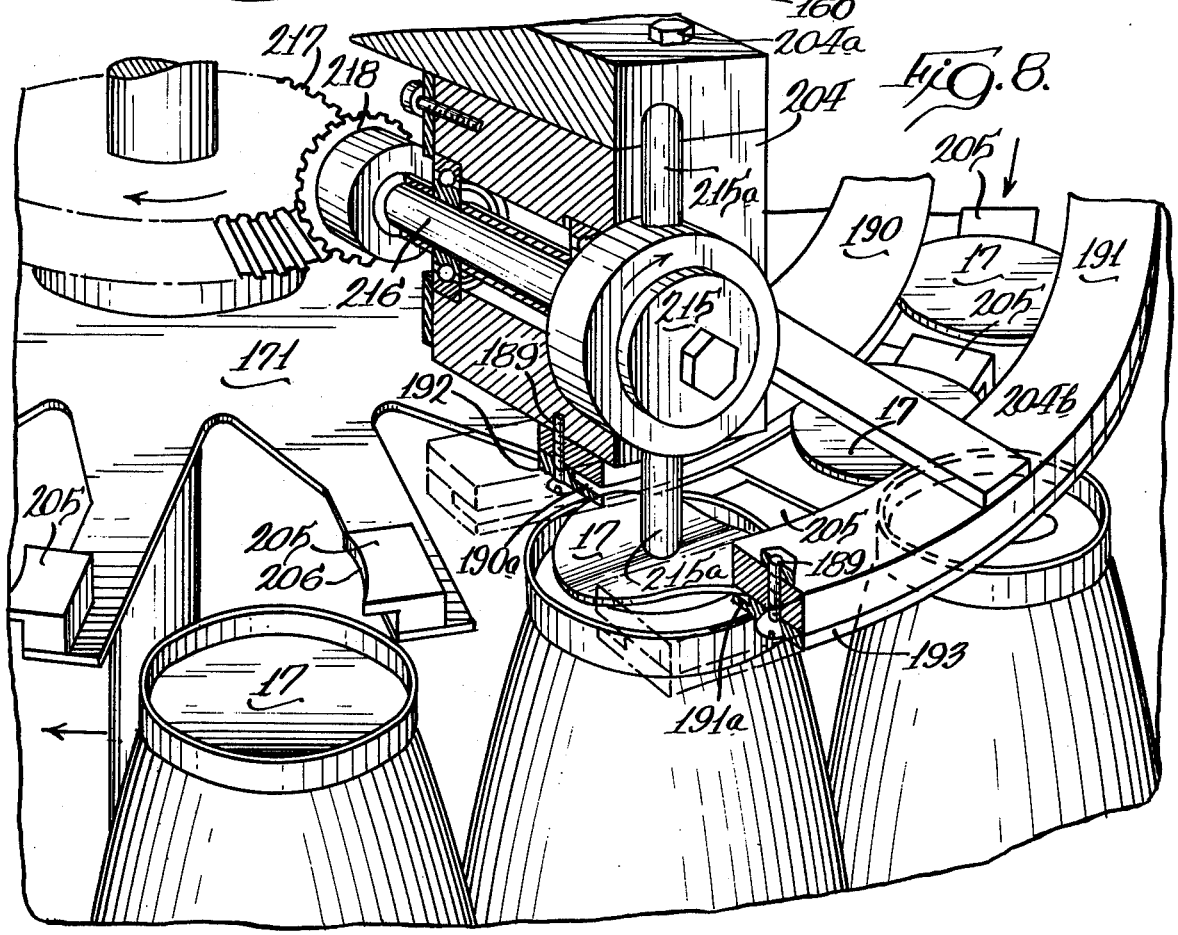

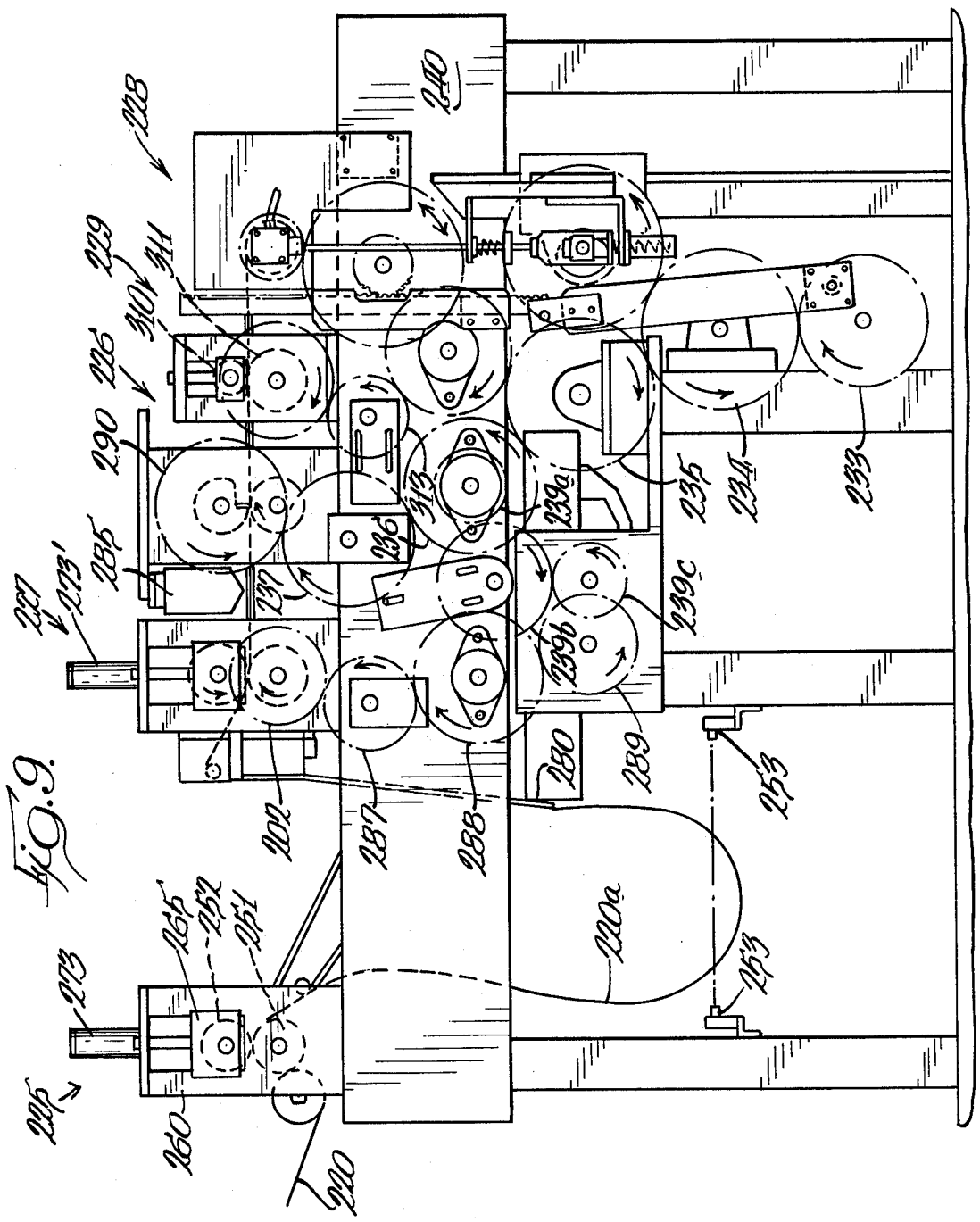

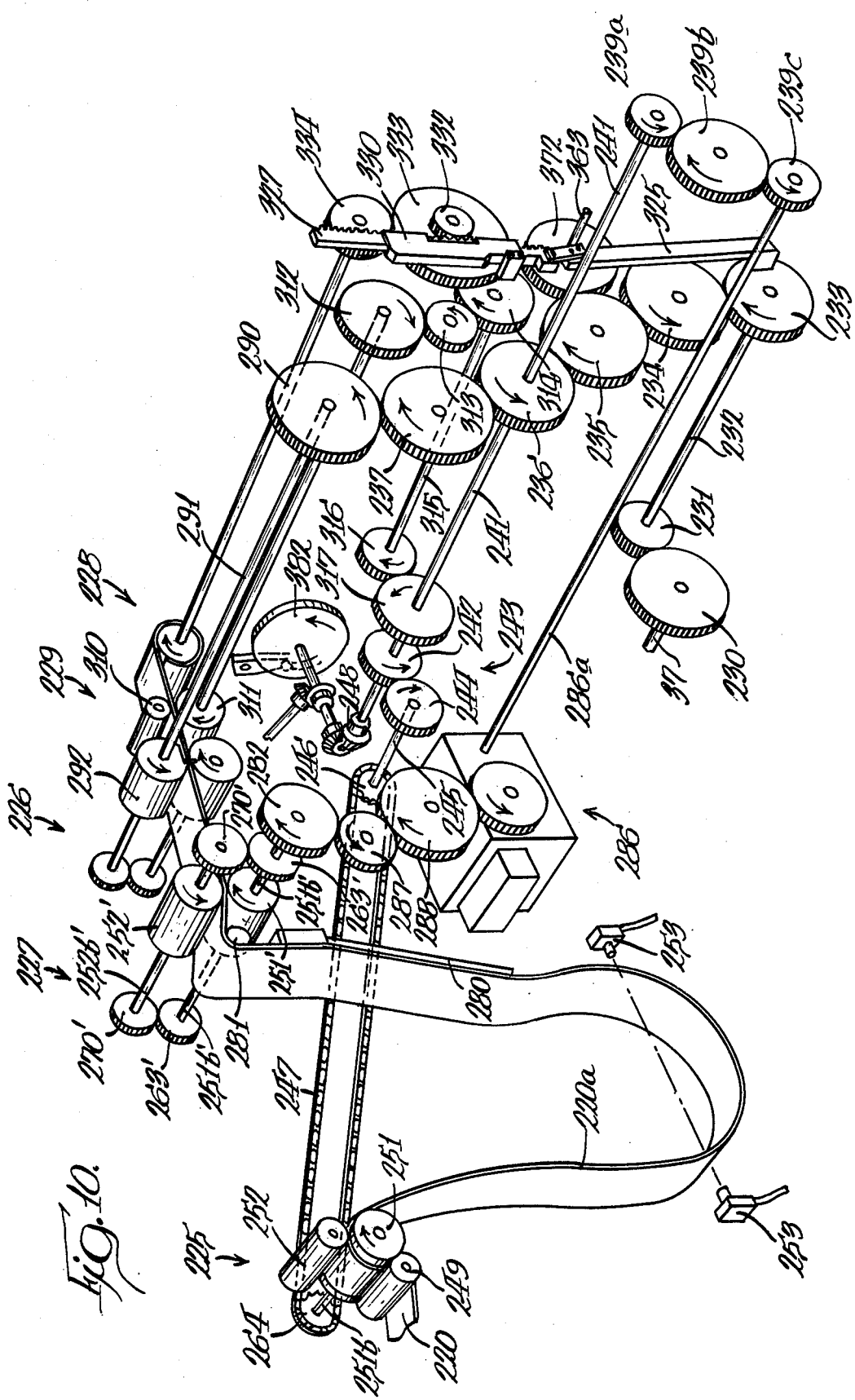

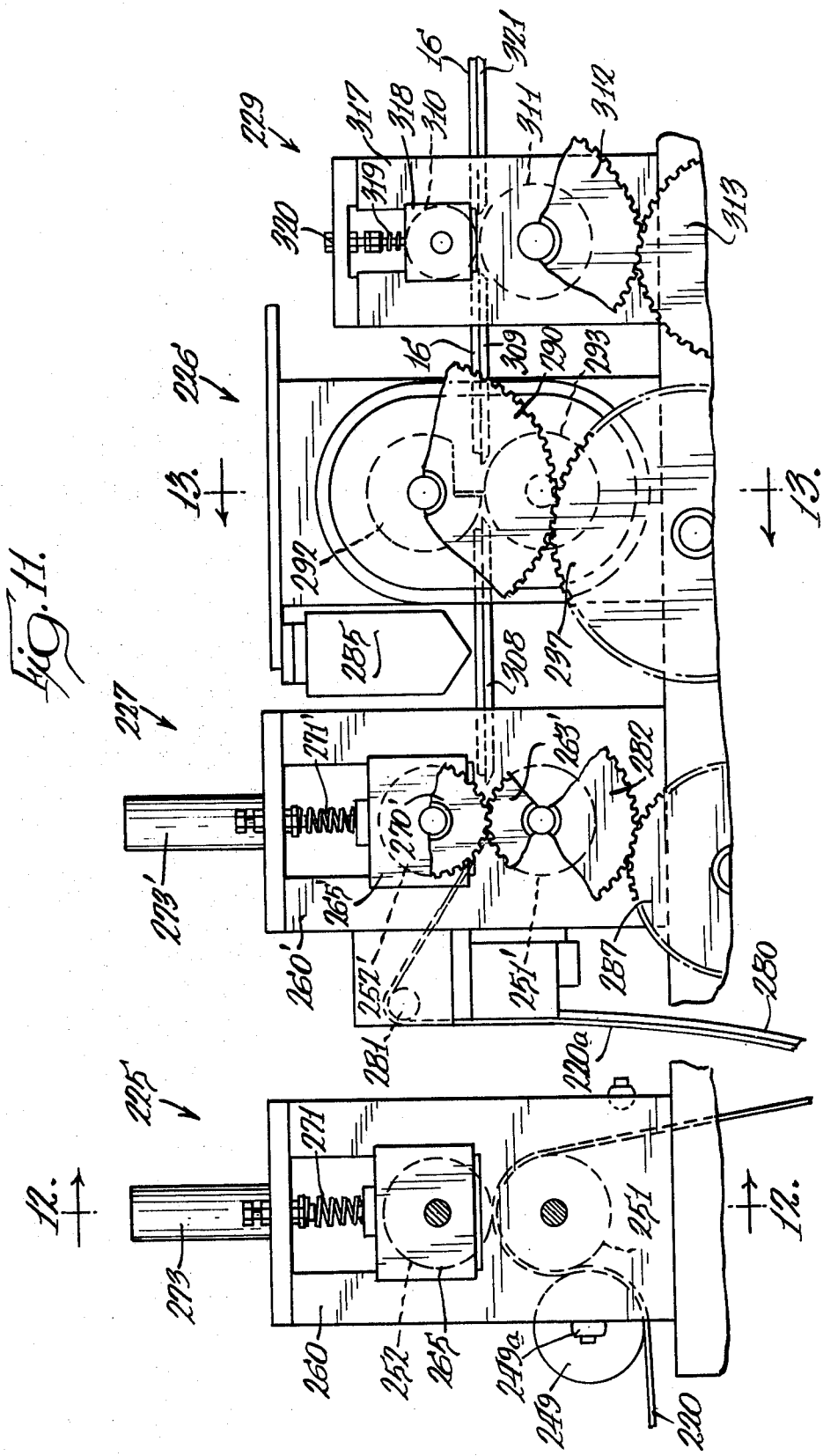

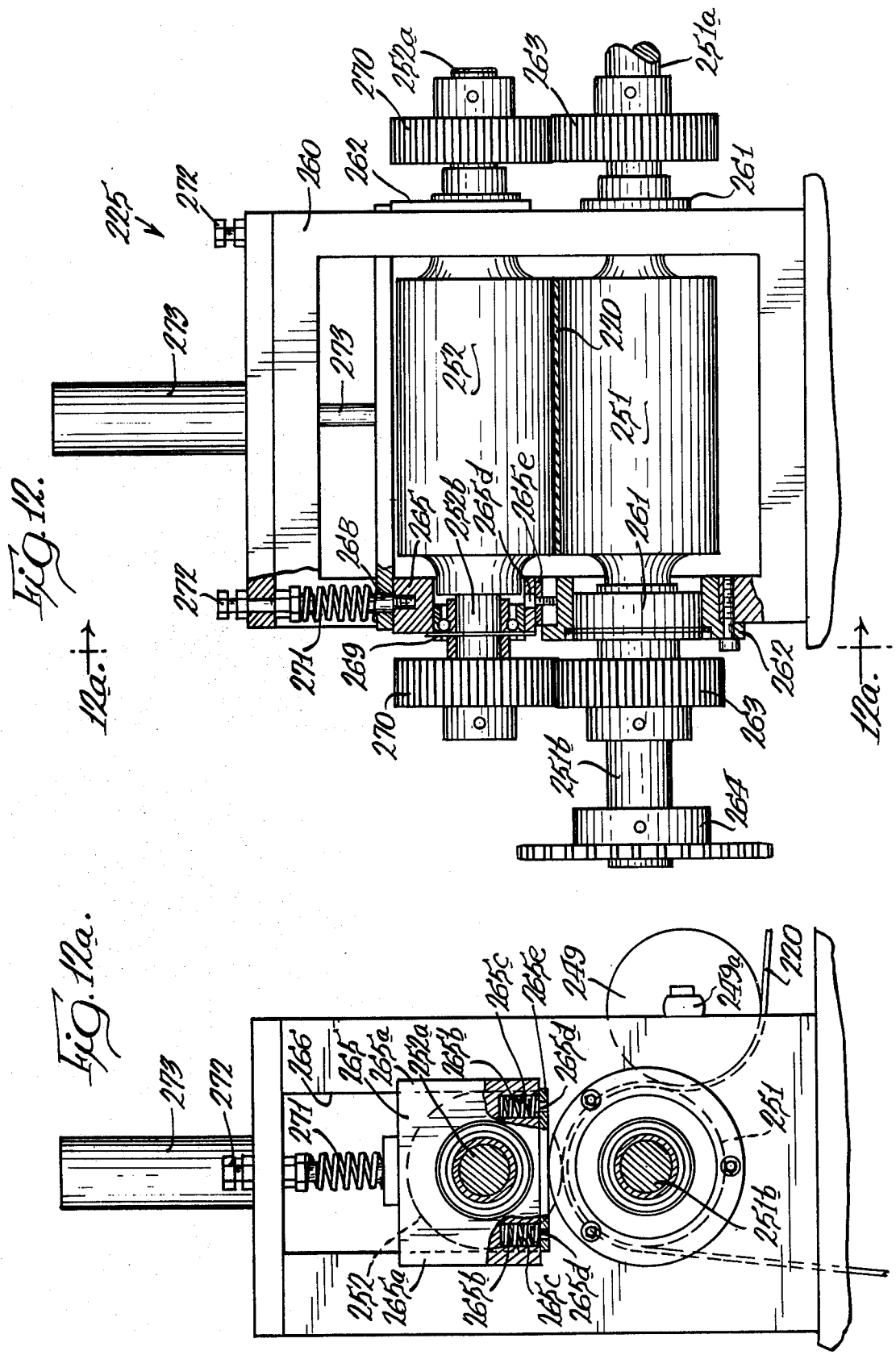

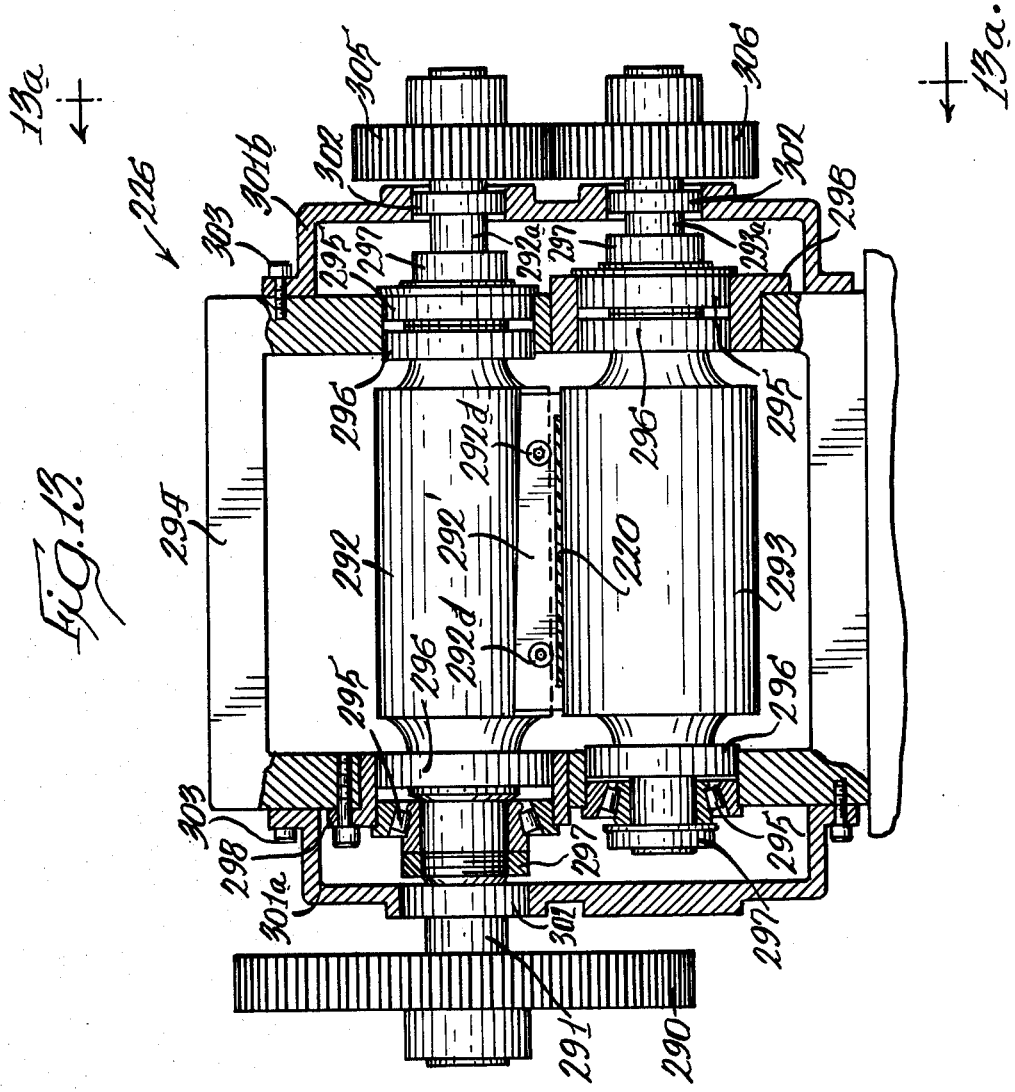
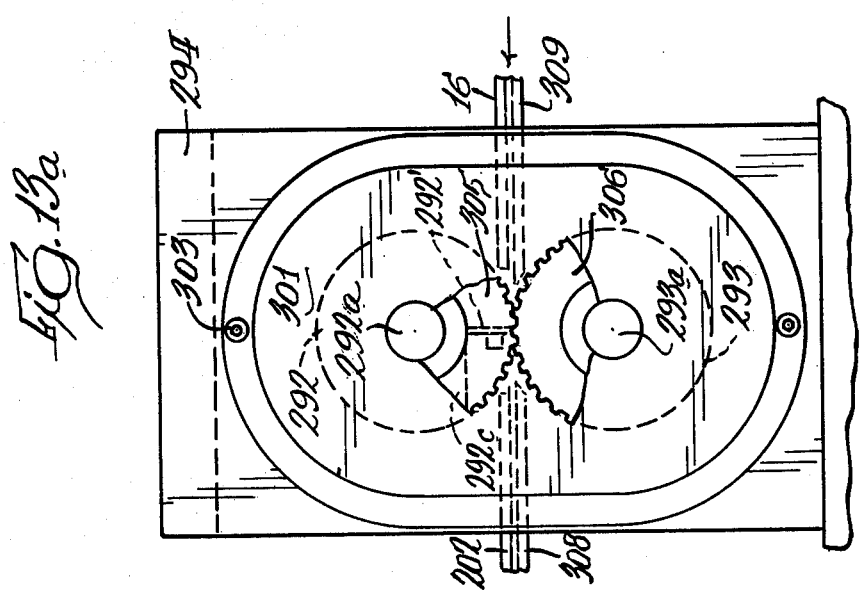

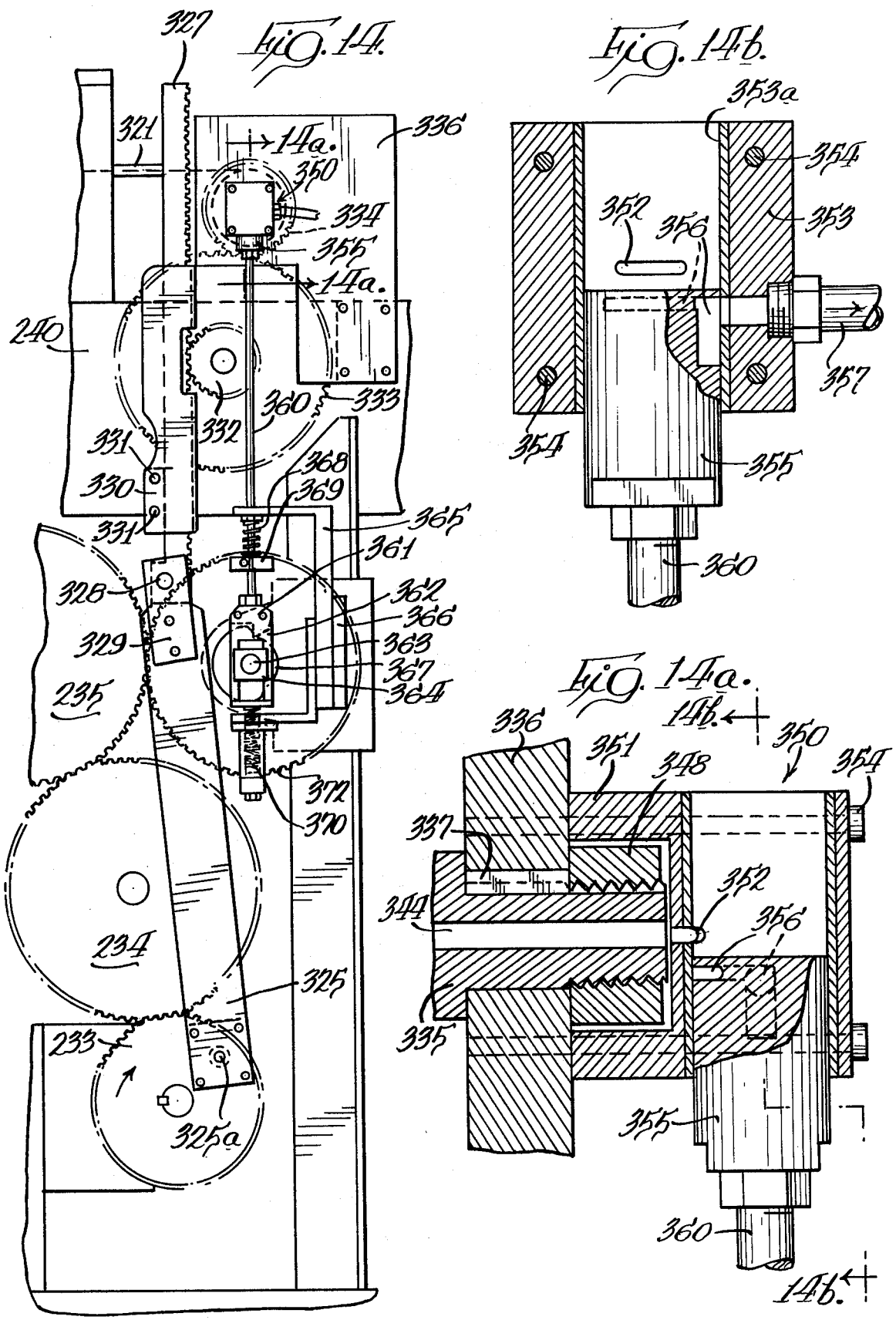

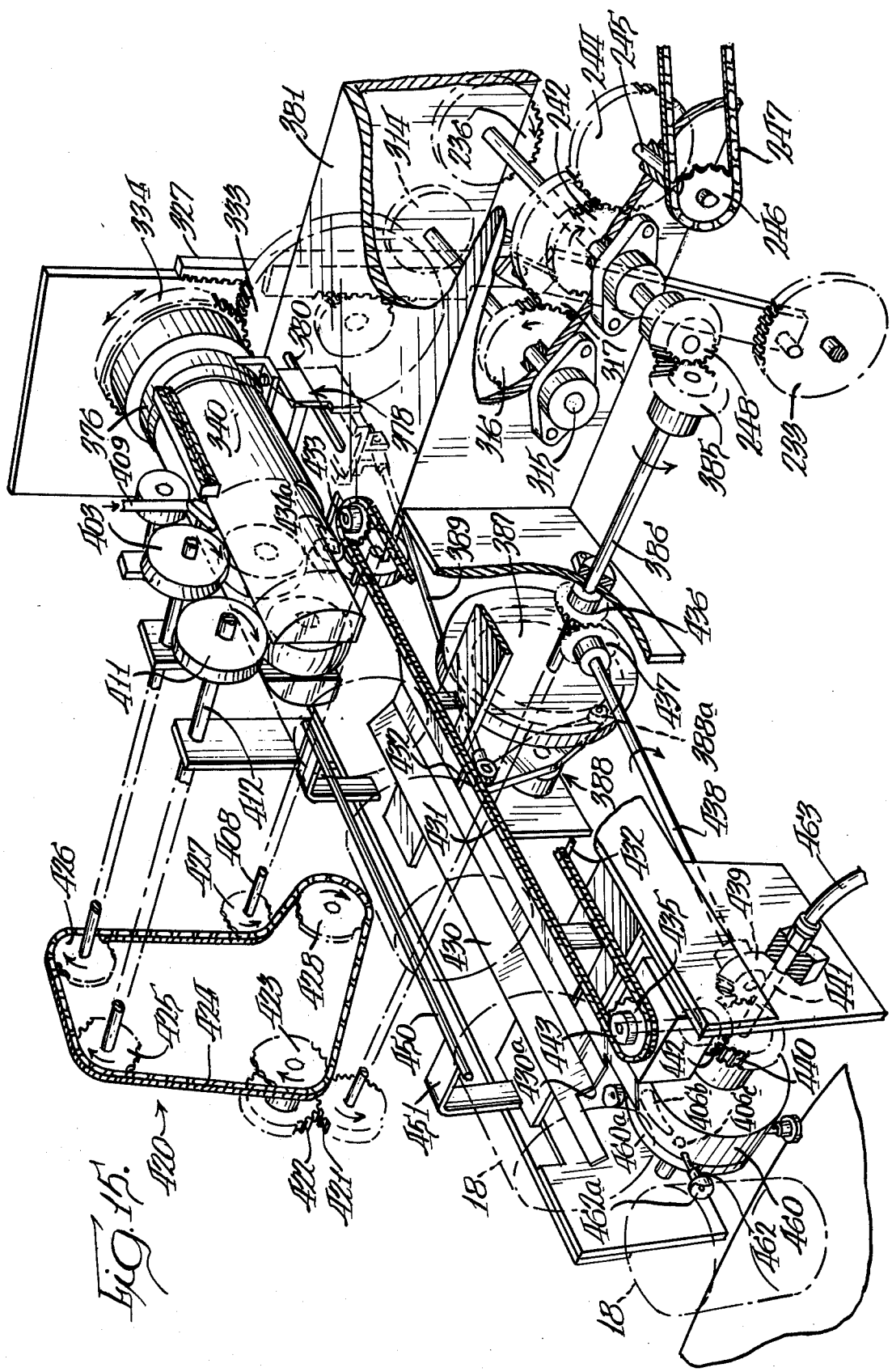

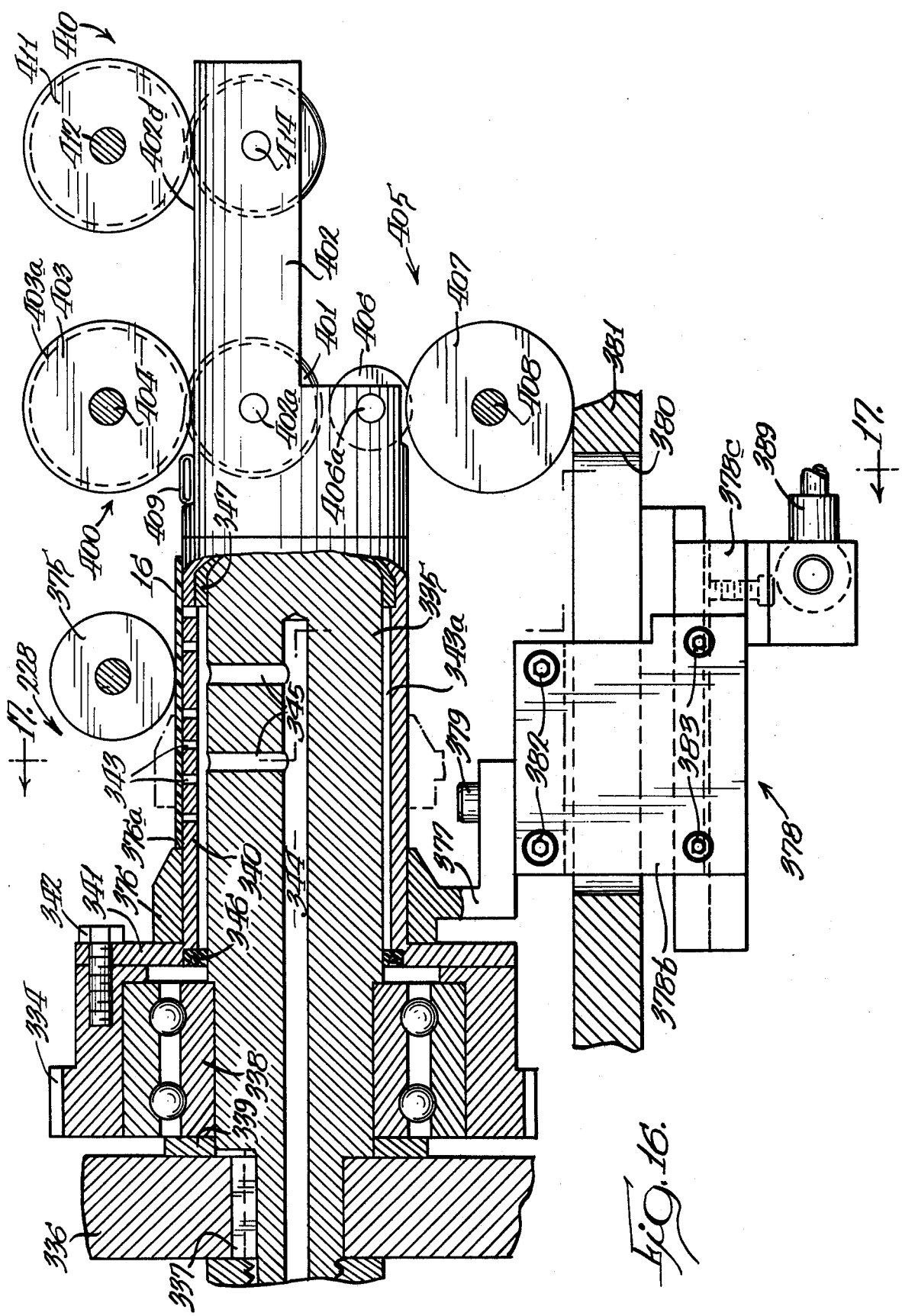

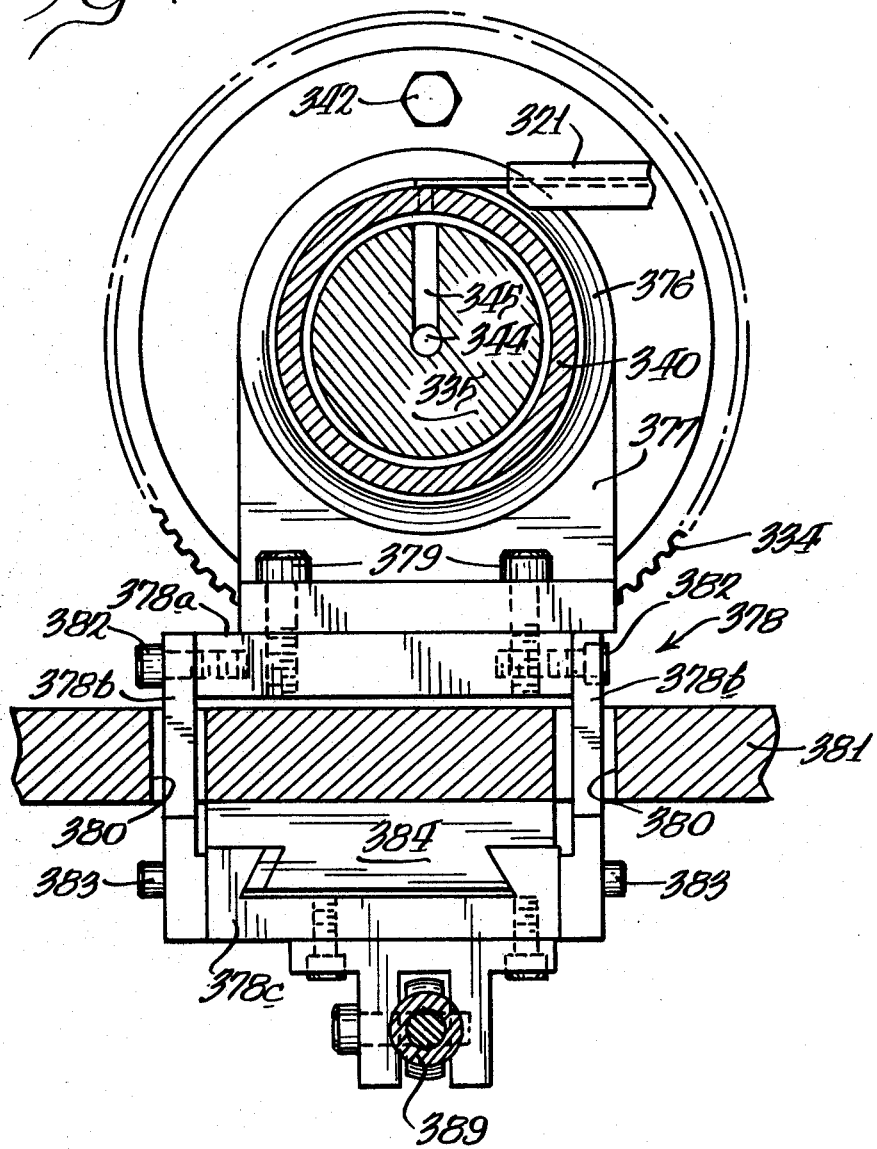

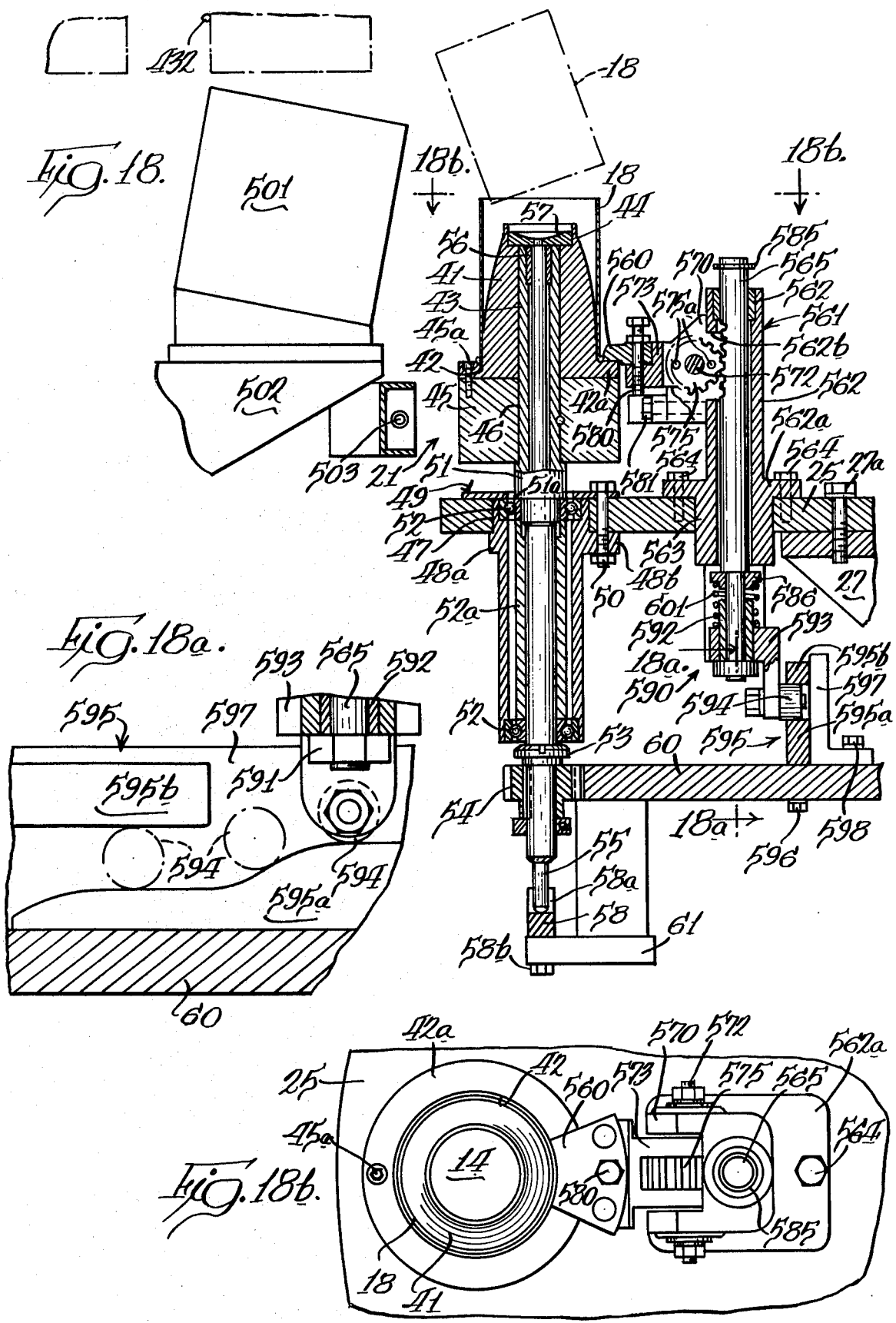

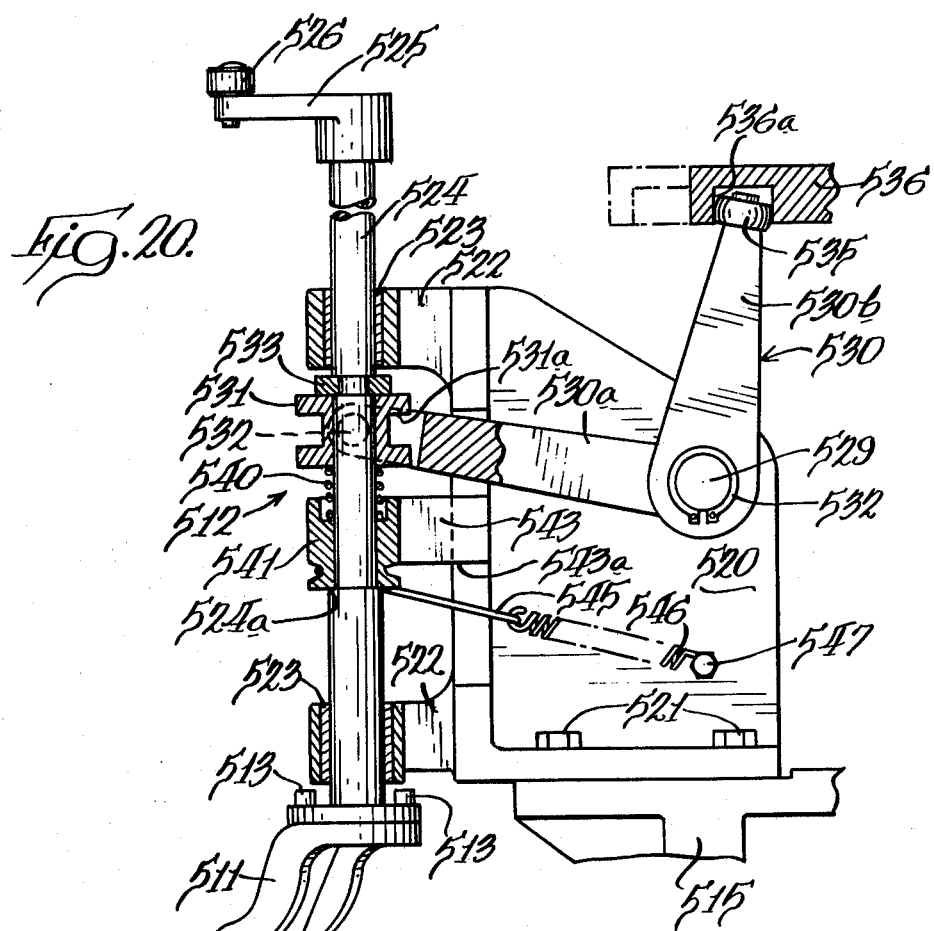
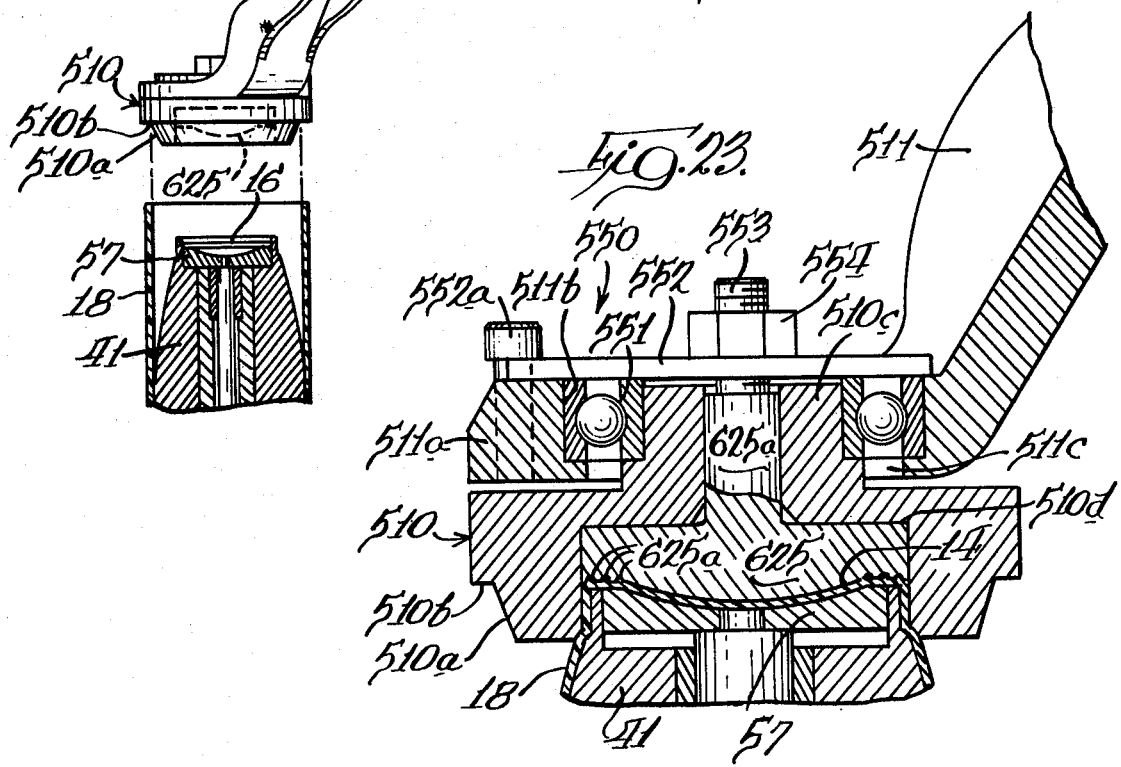

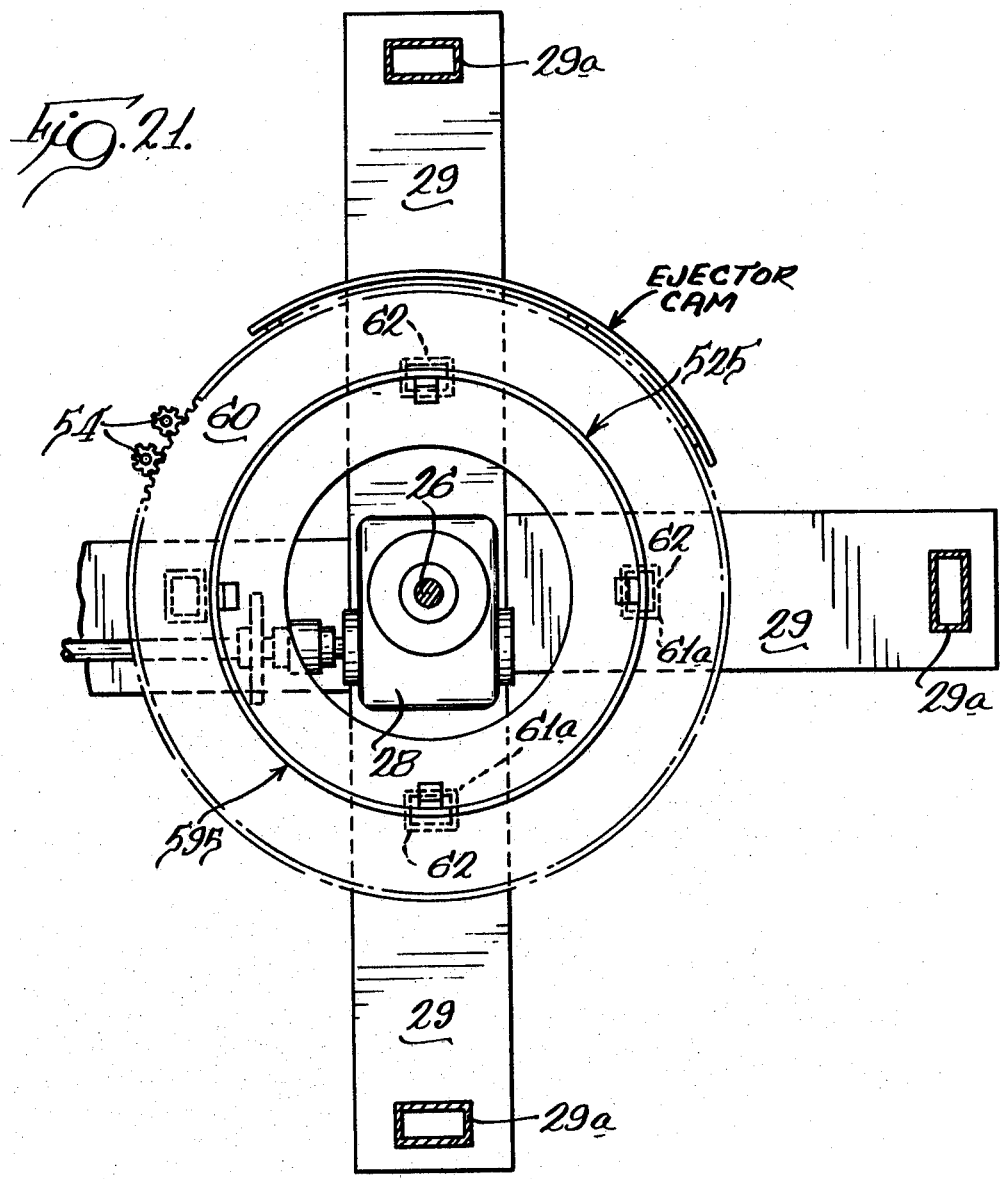

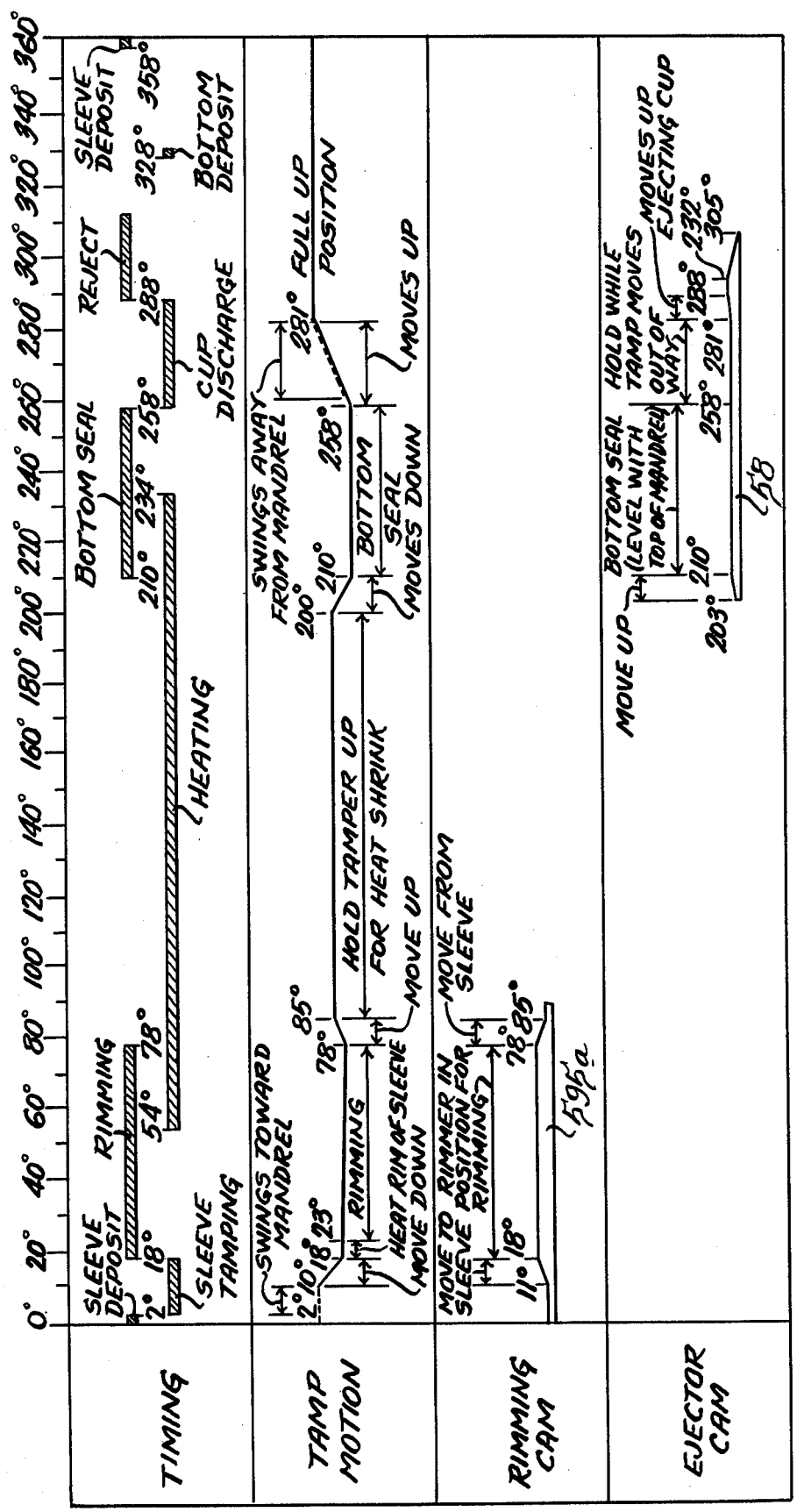

METHOD FOR FABRICATING THERMOPLASTIC CONTAINERS

This is a now abandoned division, of application Ser. No. 418,612, filed Nov. 23. 1973.

BACKGROUND OF THE INVENTION

It has been recognized that drinking cups and other nestable containers with superior properties, especially for the retention of hot beverages, such as coffee, can be formed from expanded thermoplastic materials, the most popular of which has proven to be expanded polystyrene. Several different types of containers and methods for producing them have been proposed, and some have been successful in the marketplace.

Several design criteria which have been sought to be achieved are the elimination of postprinting of containers after they have been fabricated, the production of containers with different sidewall configurations (and different capacities) including convex and concave surfaces with minimum set up expense, and the elimination of waste materials during the production of containers.

Commonly assigned copending Amberg et al., U.S. Patent application Ser. Nos. 683,466, filed May 5, 1976; 683,893, filed May 6, 1976; 683,745, filed May 6, 1976, now U.S. Pat. 4,053,346, and 683,746, filed May 6, 1976, are divisional applications of 479,421, filed June 14, 1974, now U.S. Pat. No. 3,970,492, which issued on July 20, 1976. The latter application was a continuation-in-part of 354,305, now abandoned, which in turn was a continuation-in-part of Ser. No. 211,259, filed Dec. 23, 1971, now U.S. Pat. No. 3,854,582, which issued Dec. 17, 1974. The above-mentioned patents and patent applications emanating in part from Ser. No. 211,259, along with Ser. No. 473,998, filed May 28, 1974, which issued as U.S. Pat. No. 3,995,740 on Dec. 7, 1976, and also was a continuation-in-part of 211,259, disclose methods and apparatus for forming two piece nestable cup. While the method and apparatus of this mentioned invention functions well to produce nestable cups, the need remains for a simplified and less costly method and apparatus.

Commonly assigned Amberg et al., U.S. Pat. application Ser. No. 418,562, filed Nov. 23, 1973, now U.S. Pat. No. 3,969,173 issued July 30, 1976, disclose a related method and apparatus for fabricating two-piece thermoplastic cups. The application discloses an advanced method and apparatus over the last mentioned Amberg et al. application which has improved upon the method of handling the web stocks which form the sidewall and bottom closure discs.

SUMMARY OF THE INVENTION

In accordance with the present invention, there is provided method and apparatus for forming thermoplastic containers which utilizes the inherent properties of the thermoplastic material and advanced methods to form the material into containers.

The present invention utilizes the column strength of a formed cylindrical blank to allow rimming of the container by forcing the cylindrical blank into a heated rimming die while on a forming mandrel and rotating the cylindrical blank and mandrel to produce a rim at the edge thereof before the cylindrical blank is shrunken about the mandrels.

The apparatus for forming thermoplastic cups in accordance with the method of the present invention includes a continuously rotating turret which carries a plurality of upwardly facing spaced mandrels having an external configuration corresponding to the internal contour of the container to be formed. The mandrels are generally circular in cross-section and have a reduced diameter at their upper end and a larger diameter at their lower end. The turret continuously rotates the mandrels about their axes and moves the mandrels around a closed path through a series of operational sub-assemblies which function in timed sequence and interrelationship with the mandrels to form the containers.

Bottom closure discs are cut from a first web of thermoplastic material and transferred to a semicircular conveyor track which overlies the cutting station at one end and the path of the mandrel tops at the other end, so that bottom closure discs may be transferred therealong for deposition on the tops of the mandrels. Rectangular blanks, which will be formed into the container sidewalls, are cut from a second continuous web of heat-shrinkable thermoplastic material and formed into cylindrical sleeves and transferred along a conveyor to be picked up by a vaccum pickup wheel and transferred about the forming mandrels.

An annular rimming die is provided adjacent the bottom of each of the mandrels. After the bottom closure discs and cylindrical sleeves have been placed on the mandrels, a combination tamping plate and sealing die is axially aligned with such mandrel and cammed downwardly to initially align any askew sleeves and then cause the cylindrical sleeves to be forced into engagement with an upwardly facing, concave portion of the heated rimming die at the bottom of the mandrel. A complementary rimming die portion having a concave die surface is brought into juxtaposition with the mandrel rimming die to form a complete die. The forming mandrel and heated mandrel rimming die are rotated relative to the die portion so that, as the cylindrical sleeve is pressed downwardly, a rim is formed at the lower edge of the cylindrical blank.

The cylindrical sleeves are held on the forming mandrels by the enlarged portions at their lower end, which correspond to the maximum diameter of the containers.

After the rim has been formed the combined tamping plate and sealing die is cammed upwardly out of contact with the sleeve. The forming mandrel is continuously rotated throughout its movement with the turret and proceeds past heating means disposed adjacent the path thereof to cause the sidewall to shrink to the contour of the forming mandrel. The cylindrical sleeve extends above the top of the forming mandrel so that the upper end portion thereof is caused to turn inwardly into overlying relationship with the bottom closure disc on the top of the mandrel. As the forming mandrel is carried past the heating means, the bottom disc closure is raised from its recessed position in the top of the mandrels by a plate to heat it and thus present it in condition for sealing to the inturned portion of the sidewall. When the sidewall has been shrunken and the bottom disc heated, the combination tamping plate and sealing die is cammed downwardly into engagement with the inturned end portion of the cylindrical sleeve and cooperates with the plate which has raised the bottom closure out of its recessed position to compress and seal the periphery of the disc to the inturned sidewall portion. The plate upon which the bottom disc is carried on the top of the mandrel and the die portion of the combination tamping plate and sealing die are contoured complementary to provide the desired contour of the bottom of the container to be formed.

After the disc has been sealed to the sidewall, the combination tamping plate and sealing die is cammed upwardly and moved out of alignment with the mandrel. The formed container is then removed from the forming mandrel by camming the disc plate upwardly to cause the container to be released from the surface of the forming mandrel. The released container is then carried away by a pneumatic tube positioned above the path of the forming mandrels. The mandrels then proceed to the bottom closure disc conveyor to receive a new disc and the operational cycle is repeated.

With the process and apparatus of the present invention, containers having exceptional insulating properties can be fabricated at relatively low cost. Since the operation of the machine is continuous in nature, and due to the utilization of the column strength and heat-shrinking properties of the material used for fabricating the sidewalls, an extremely simple machine and method are provided at significant cost savings. Additionally, the size of the overall machine is greatly reduced, as well as providing for rapid changes in sizes and shapes of containers to be manufactured by changes in a smaller number of components than is possible with prior art mechanisms.

BRIEF DESCRIPTION OF THE DRAWINGS

FIG. 1 is a schematic perspective view representing an exemplary form of apparatus in accordance with the present invention;

FIG. 4 is an enlarged side elevation view, with certain portions broken away, taken substantially along line 4—4 on FIG. 2 of the bottom disc cutting station;

FIG. 5 is a timing diagram illustrating the operation of the bottom disc punching elements;

FIG. 6 is an enlarged section view taken along line 6—6 on FIG. 4 of the bottom disc punching and transfer subassemblies;

FIG. 7 is an enlarged perspective view, with certain portions in cross section, illustrating the bottom disc lifter and transfer mechanisms;

FIG. 8 is an enlarged perspective view with certain portions broken away, illustrating the apparatus for transferring discs to the forming mandrels;

FIG. 9 is an enlarged side elevation view, taken substantially along line 9—9 on FIG. 2, of the sidewall web handling and winding subassembly;

FIG. 10 is an exploded schematic view illustrating the drive for the subassembly of FIG. 9;

FIG. 11 is an enlarged side elevation view showing the sidewall web handling and cutter rollers;

FIG. 12 is an enlarged sectional view taken along line 12—12 on FIG. 11 illustrating the unwinding rollers;

FIG. 12a is a sectional view taken along line 12a-12a on FIG. 12;

FIG. 13 is an enlarged sectional view taken along line 13—13 on FIG. 11, illustrating the cutter rollers;

FIG. 13a is a side elevation view taken along line 13a—13a on FIG. 13;

FIG. 14 is a partial fragmentary side elevation view of the sleeve winding roller drive;

FIG. 14a is an enlarged sectional view taken along line 14a—14a on FIG. 14 illustrating the vacuum supply apparatus for the sleeve winding roller;

FIG. 14b is a sectional view taken along line 14b—14b on FIG. 14a.

FIG. 15 is an exploded perspective view schematically showing the sleeve winding and transfer apparatus;

FIG. 16 is an enlarged, fragmentary sectional view taken along line 16—16 on FIG. 2 illustrating the sleeve winding apparatus;

FIG. 17 is a sectional view taken along line 17—17 on FIG. 16;

FIG. 18 is an enlarged sectional view taken substantially along line 18—18 on FIG. 2 illustrating the rimming apparatus;

FIG. 18a is a fragmentary enlarged sectional view taken along line 18a—18a on FIG. 18;

FIG. 18b is an enlarged fragmentary plan view taken along line 18b—18b on FIG. 18;

FIG. 20 is an enlarged sectional view with certain portions shown in cross section illustrating the tamping and sealing die apparatus;

FIG. 21 is a schematic plan view illustrating the rimming, bottom sealing and ejector cams;

FIG. 22 is a timing diagram illustrating the operation of apparatus of the invention; and FIG. 23 is an enlarged sectional view taken along line 23—23 on FIG. 2 illustrating the bottom sealing mechanism.

DETAILED DESCRIPTION OF THE INVENTION

Figure 1A:
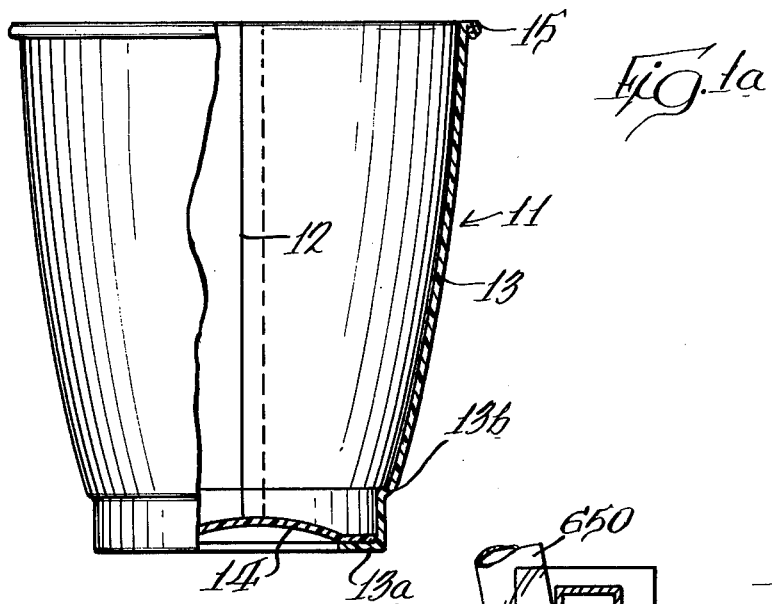
FIG. 1a is an enlarged elevation view, partly in section, of a nestable insulated container produced by the present invention.

While this invention is susceptible of embodiment in many different forms, there is shown in the drawings and will hereinafter be described in detail only a preferred embodiment of exemplary apparatus and methods for fabricating containers in accordance with the present invention and with the understanding that the present disclosure is to be considered as an exemplification of the principles of the invention and is not intended to limit the invention to the specific embodiment illustrated and described. The scope of the invention will be pointed out in the appended claims.

While nestable insulated cups, in accordance with the present invention, can be constructed in a variety of configurations, a presently preferred two-piece embodiment of such cup, is shown at 11 in FIG. 1a, and is comprised of a contoured sidewall 13 having a vertically extending side seam 12 and a contoured bottom closure disc 14 joined to an inturned bottom portion 13a of the sidewall. The top of the sidewall is provided with an outwardly curled lip or rim 15, and a stacking shoulder 13b may be provided adjacent the bottom of the sidewall. For further details regarding the cup per se, reference should be made to the above mentioned Amberg et al applications.

Turning now to the preferred embodiment of the apparatus of the present invention, which is shown in its entirety in FIGS. 1 and 2, the apparatus may be considered to be comprised of a plurality of separate working stations, or subassemblies, which are hereinafter discussed individually essentially in the order in which they operate. The apparatus includes a main turret 250 having a plurality of spaced, upwardly facing mandrels thereon, with turret 250 being rotated in a counter-clockwise direction to a bottom disc cutting station 100 ("10 O'clock" position), which includes an arcuately shaped disc transfer conveyor that transfers discs from a punching mechanism to the mandrels on the main conveyor; a sleeve-forming station 200 and sleeve transfer conveyor 300 ("9 O'clock" position), which transfers sidewall sleeves onto the mandrels; a rim-forming station ("8-6 O'clock" position) generally indicated at 400 where the cylindrical sleeves are forced downwardly into a heated rimming die; a heat shrinking station 500 ("2-12:30 O'clock" position); and a container removal or discharge section 700 ("12:30-11:30 O'clock" position). While the various mechanisms and process steps are hereinafter discussed individually, it should be understood that the various steps and operations are performed in timed sequence in proper interrelationship with respect to one another so that the various mechanisms cooperate in the form of a true combination.

MAIN CONVEYOR AND DRIVE SYSTEM

Figure 19:
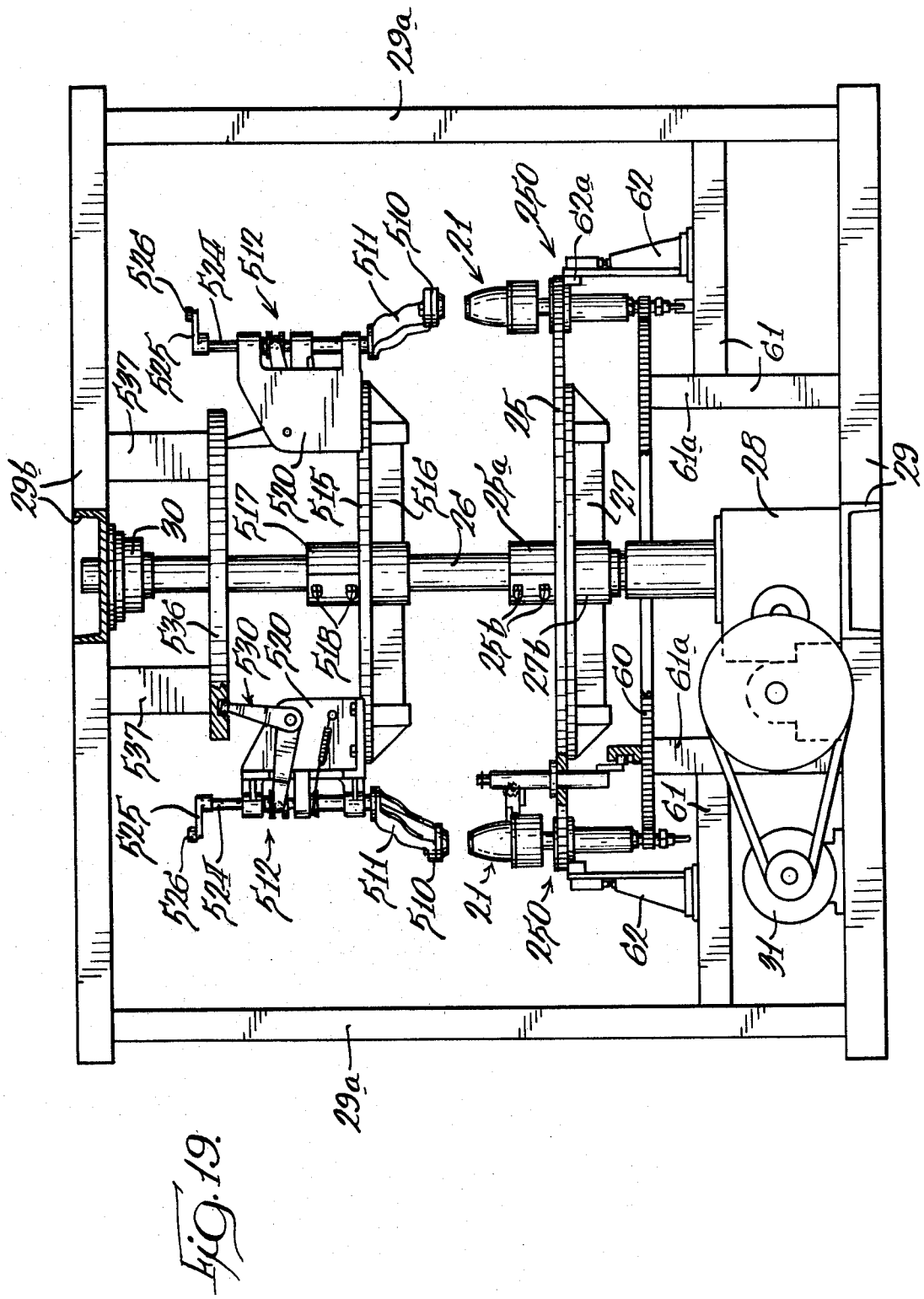
FIG. 19 is an end elevation view of the mandrel turret, with certain portions broken away for clarity of illustration.

The main conveyor 250, FIG. 19, which transfers forming mandrels 21 through the above mentioned series of operational stations, comprises a generally circular turret plate 25 disposed horizontally and secured to a machine main shaft 26 by collar 25a and bolts 25b. A plurality of closely circumferentially spaced mandrels 21 are provided on plate 25, and mandrels 21 move in a circular path about the axis of shaft 26 as shaft 26 rotates place 25. Plate 25 includes a diameterically disposed reinforcing web 27 secured thereto at the lower surface by bolts 27a (FIG. 18), and a hub 27b at the mid-portion of web 27 is rotatably mounted on shaft 26. Shaft 26 extends vertically upwardly from a right angle gear reducer 28, which is positioned on machine base 29. Vertical uprights 29a extend upwardly from base 29, and are interconnected above the turret by perpendicular crossbraces 29b which carry a bearing 30 at their juncture to support the upper end of shaft 26.

Figure 3:
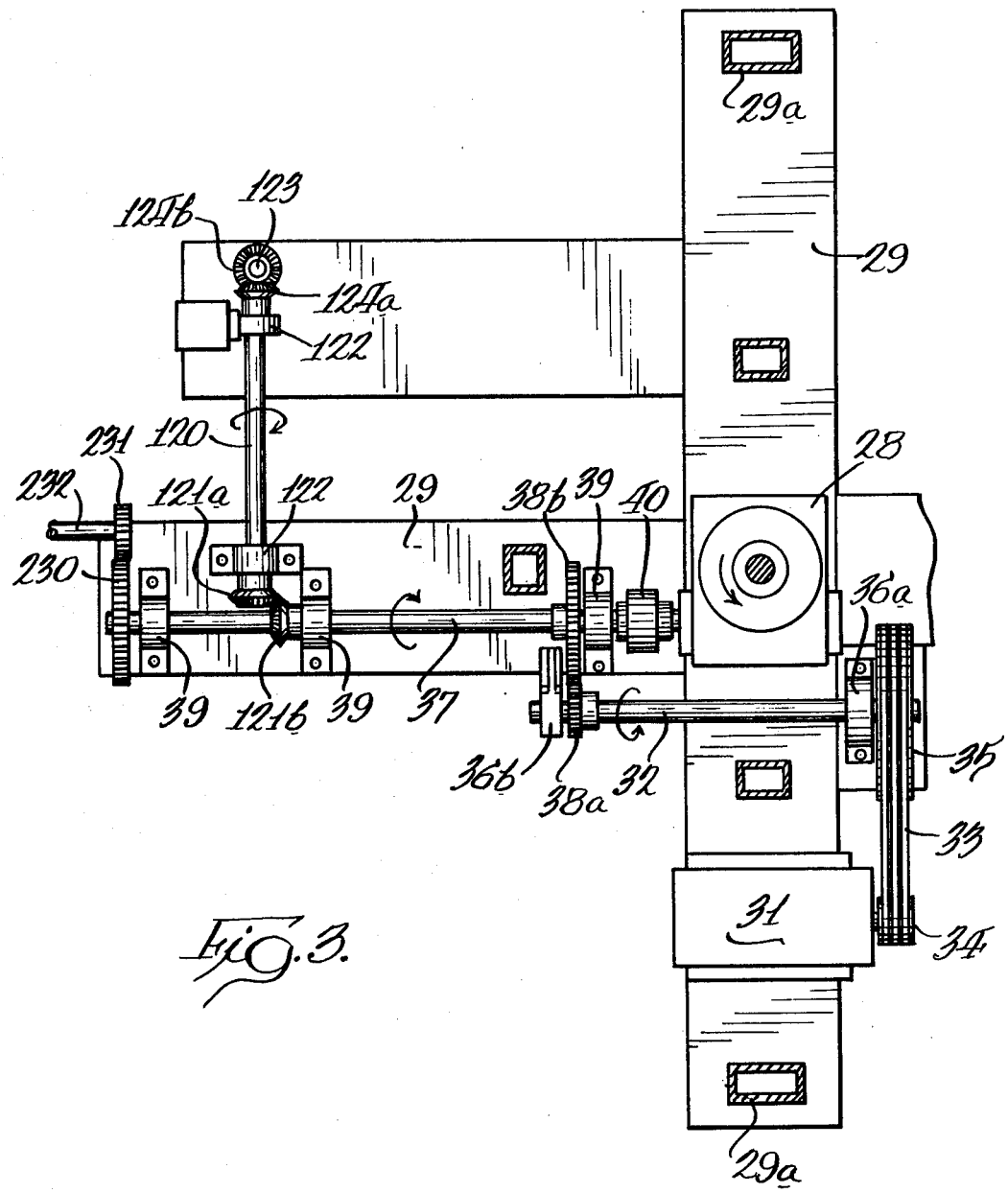
FIG. 3 is a plan view illustrating the main drive system.

As can be best seen in FIG. 3, drive for the main conveyor and various subassemblies is provided by a motor 31 mounted on base 29, which drives transfer shaft 32 through a plurality of belts 33, and pulleys 34 and 35, respectively keyed to the motor 31 and shaft 32. Shaft 32 is supported at each end on the base frame by bearings 36a and 36b, and shaft 32 drives a parallel shaft 37 through gear 38a on shaft 32 and gear 38b on shaft 37. Shaft 37 extends outwardly of gear box 28 and is supported at three spaced locations on base 29 by bearings 39. The inner end of shaft 37 provides power to gear box 28 through a suitable coupling 40 to drive shaft 26 and the outer end provides power to the sidewall forming mechanism 200, by gear 230, as will be described in greater detail below. The bottom disc cutting mechanism 100 receives power input from shaft 37 by means of bevel gear 121b which meshes with a bevel gear 121a on a perpendicularly disposed shaft 120.

Referring to FIGS. 18 and 19, mandrels 21 each include a contoured forming portion 41 and a horizontal, outwardly extending flange 42a which is utilized in rimming the cup, as will be described in greater detail below. An upwardly facing, circumferentially continuous arcuate die recess 42 is provided at the junction between forming portion 41 and flange 42a. Contoured portion 41 is hollowed to provide a vertical bore 43 and an enlarged diameter recess 44 at its upper end. Each mandrel 21 is mounted on a circular block 45, which acts as a heat sink, by means of bolts 45a, which bear against flange 42a and extend downwardly into threaded holes block 45. Each block 45 is also provided with a vertical bore 46 corresponding in size and aligned with the bore 43 of the associated mandrel.

Plate 25 is provided with a set of mounting holes 47 at angularly spaced locations adjacent the outer edge thereof in which are positioned downwardly extending, vertical, elongated, hollow mounting sleeves 48. Sleeves 48 are positioned on the turret by means of shoulder portions 48a and 48b at the upper end of the sleeves which bear against the lower surface of the turret when the sleeves are inserted in holes 47, and a disc-shaped mounting member 49 which spans the top surface of sleeve 48 and plate 25 and which is interconnected with sleeve portions 48b by bolts 50. An elongated hollow spindle 51, corresponding in diameter at its upper end with bores 43 and 46, is positioned therein and keyed to block 45. Spindles 51 each extend downwardly into a sleeve 48, and are rotatably supported therein by bearings 52 at opposite ends of each sleeve 48. The intermediate portions of the spindles 51 include a downwardly facing shoulder portion 51 that engages the top surface of the inner race of the upper bearing 52, and an adjustment collar 53 is threaded on the lower portion of the spindle to engage the inner race of the lower bearing 52 and hold the same against a cylindrical bearing retainer 52a.

Spindle 51 terminates below the end of sleeve 48 and a gear 54 is mounted thereon, which, as will be described in detail below, is used to continuously rotate the forming mandrel during rotation of the turret. A control rod 55 is positioned within spindle 51 and extends from the top to below the bottom thereof and is supported therein by means of bearings 56 at the upper and lower ends of the spindle. A horizontally disposed plate 57 is attached to the top end of rod 55 and is positioned in the recess 44 in the upper end of the mandrel. The bottom disc closures 17 are carried on plate 57, the upper surface of which is contoured to correspond to the desired configuration of the bottom of the container. The lower end of control rod 55 that extends below the elevation of the spindle engages the control surface 58a of a control cam 58 which is utilized to raise and lower the bottom disc closures during heat shrinking and bottom sealing operations, as will be described in greater detail below. Cam 58 is connected to a horizontally disposed frame member 61 by bolts A bull gear 60 is supported horizontally at the elevation of the paths of gears 54, FIG. 19, by upwardly extending frame members 61a, and gear 60 meshes with gears 54 to rotate the mandrels 21 as the turret is rotated. The turret is supported at its outer periphery at spaced intervals by means of brackets 62 which are mounted on horizontal frame member 61, and which adjustably position a low-friction slide block 62a, which slidingly bears against the lower surface of the turret plate 25.

BOTTOM DISC CUTTING STATION

Circular bottom closure discs 14 are cut from a continuous web 101 of thermoplastic material by a cutting mechanism, best shown in FIG. 4. Web 101 is fed from a spool mounted roll 102 which pays-out the web in a horizontally disposed orientation. Web 101 is continuously unwound from roll 102 by unwinding roller means 105 (described in detail below) which direct the web from left to right as viewed in FIG. 4. Frame-mounted guide tracks 107a and 107b direct the web to and from the unwinding roller means 105 and a guide track 108 positioned downstream guide track 107b directs the web to punching mechanism 106 (hereinafter described in detail). Web 101 is unsupported between guide tracks 107b and 108 to form a supply loop 101a.

Web 101 is intermittently pulled through punching mechanism 106 by a feed means 110, positioned downstream from the punching mechanism, and the discs 14 are severed from the web during the dwell periods of the intermittent feed. Horizontal guides 109 are provided between the punching mechanism and the feed means 110 for supporting the web therebetween. The scrap web that remains after the bottom discs have been severed is guided by an arcuate track member 111 into L-shaped pneumatic tube 112 positioned at the end of the apparatus which removes the waste web.

After the bottom disc is cut from web 101, it is transferred upwardly by a lifter mechanism mounted coaxially with the cutter, as described in greater detail below, and transferred to an arcuate conveyor track 170 which overlies the punching mechanism at one end and the path of the top of the mandrels at the other end. The bottom discs are transferred along the arcuate conveyor path by means of a star wheel and discharged serially to the recesses in the top of the mandrels, all of which is subsequently explained in greater detail.

Referring to FIGS. 3 and 6, power input to the bottom punching station 100 is provided by previously mentioned drive shaft 120. Shaft 120 is mounted to the base frame by spaced bearings 122 and drives a vertically disposed shaft 123 by means of bevel gears 124a and 124b on shafts 120 and 123, respectively. The lower end of shaft 123 is supported in a bushing 123a carried on the base of the machine and a frame mounted bearing 123b supports shaft 123 adjacent its upper end. A bevel gear 125 at the upper end of shaft 123 drives a horizontally disposed shaft 126 by means of a bevel gear 126a at the end thereof, and shaft 126 is supported in spaced, vertical frame members 127 by means of bearings 128.

Power in-put is provided to the unwinding means 105 and feed means 110 from shaft 126 through a gear train including drive gear 130 mounted on shaft 126, transfer gears 131, 132 and 133, which are rotatably mounted on frame member 127, FIG. 4. Transfer gear 133 meshes with a gear 135 mounted on shaft 136 which carries a lower pull roller of the feed means 110 to provide power input thereto. A sprocket 137 is mounted outboard of gear 135 and carries a chain 140 which drives a sprocket 141 mounted on a shaft 142 of the unwinding means 105 to provide power input thereto. A tensioner assembly 139 is pivotally attached to frame member 127 and bears against the lower run of chain 140 to control the tension in the chain.

Unwinding means 105 consist of a pair of vertically aligned cylindrical rollers, a lower roller mounted coaxially with shaft 142 and rotatable therewith, and an upper roller mounted coaxially on a shaft 143 parallel with shaft 142 and spaced vertically thereabove. Shaft 143 is rotatably mounted in slide blocks 144 (shown in phantom line) which are guided at each end by two spaced-apart vertically disposed guides defined by housing 145. A frame mounted air cylinder 146 positioned above the upper roller is provided to raise and lower shaft 143 within the guides.

Shafts 142 and 143 are provided with meshing gears 142a and 143a respectively, for transmitting the drive from shaft 142 to shaft 143. As indicated above, a supply loop 101a is formed in the web 101 downstream from unwinding means 105 and to this end, sensing means in the form of photoelectric sensors 147 are mounted upon frame members 127 and control the air supply to cylinder 146. In this manner, when loop 101a is reduced in size so as to raise the bottom of the loop above the sight path of sensors 147, air is supplied to cylinder 146 to cause it to lower shaft 143, thus causing the upper winding rollers to engage the web to unwind a sufficient length to replenish the supply loop below the level of the sensors. The construction and apparatus of the unwinding means 105 is similar to the sidewall web feed mechanism shown in FIGS. 12 and 12a and described below.

The pull rollers of feed means 110 are similar in construction and drive to the unwinding rollers 105 in that there are two vertically disposed rollers which are driven from shaft 136, the lower roller being mounted on shaft 136 and having a transfer gear which engages a similar transfer gear on the upper roller shaft when the shaft is lowered by air cylinder 146', it being understood that the upper pull roller remains in the lowered position during normal operation of the machine. Unlike the unwinding rollers, the pull rollers are designed to intermittently advance the web 101 past punching mechanism 106 and to this end, the pull rollers include eccentric portions to provide a high portion in engagement with the web for advancing the web and a low portion spaced from the web to form a dwell so that the web 101 is advanced for approximately the first 100° of rotation of shaft 136, as indicated by curve a in the lower diagram of FIG. 5.

Discs 14 are severed from web 101 by the cooperative action of a movable cutter 160, FIGS. 6 and 7 and a fixed die 164. Cutter 160 is cylindrical in external configuration and guided within a bore 161a of a guide member 161 that is secured by bolts 163 to a frame member 162 which spans uprights 127. Cutter 160 includes a bore 160a which extends the length thereof, and an enlarged counterbore 160b is provided at the upper end of cutter 160 for a purpose to hereafter appear. Guide member 161 defines a horizontal web guide slot 161b through which the web 101 is drawn by the pull rollers of feed means 110. Die 164 has a bore 164a corresponding in diameter to bore 161a and positioned coaxially thereof, with die 164 being mounted on the top surface of guide 161 to form the top portion of guide slot 161b. The external surface of cutter 160 is positioned in sliding surface abutting engagement with the internal surface of bore 161a and bore 164a, and the upper facing edge of cutter 161 cooperates with the inner downwardly facing edge of die 164 above slot 161b to affect a shearing action upon the web, when the cutter is moved upwardly to, in effect, punch a disc from the web.

Cutter 160 is fixedly mounted at its lower end on a horizontally disposed portion of an inverted L-shaped bracket 165 which in turn is connected to an eccentric 166 through a yoke adjustment assembly 167. Eccentric 166 produces a cutter displacement profile as indicated by curve b in FIG. 5.

A lifter assembly is provided at the punching mechanism 106 for transferring the cut discs upwardly to an arcuate conveyor 170, and the lifter assembly includes an adjustable connecting rod 175 mounted for vertical reciprocating movement within a passage 160a in cutter 160 by bearings 176 at the upper and lower portions of cutter 160. A circular lifter 177 is connected to the upper end of rod 175 by screw 178, FIG. 7. The outer diameter of lifter 177 is less than the inner diameter than cutter bore 160b so that the lifter can be nested therewith during the web cutting operation. The lower end of rod 175 is attached to a cam follower assembly 179, which includes an outwardly extending roller 180 that rides within the cam track of a cam 181 keyed to shaft 126, and cam 181 moves the lifter upwardly and downwardly within the cutter 160.

Cam 181 has a simple harmonic rise as illustrated by curve c in FIG. 5, to move the lifter upwardly in timed relationship with the upper movement of cutter 160, it being understood that the throw of cam 181 is substantially in excess of the cutter eccentric so that after a disc has been punched from the web, and elevated slightly by cutter 160, lifter 177 moves upwardly to raise the disc for transfer to arcuate conveyor 170.

BOTTOM DISC CONVEYOR

The conveyor 170, which moves discs 17 serially along an arcuate path from the bottom punching station to the top of the path of the mandrels, can be best understood from FIGS. 6, 7 and 8. As shown therein, the conveyor 170 includes two arcuate parallel, horizontally disposed guide tracks 190 and 191 which are essentially rectangular in cross section and which have recesses 190a and 191a respectively on their opposed lower facing surfaces. Complementary formed arcuate members 192 and 193 are attached to the bottom surfaces of guide tracks 190 and 191, respectively, by means of bolts 189 and 197a. The upper surfaces of members 192 and 193 beneath recesses 190a and 191a collectively form a support surface for carrying the bottom discs thereon. The leading edges 190b and 191b of guide tracks 190 and 191 are located directly above the punching mechanism and are spaced from one another by a distance greater than the diameter of lifter 177. Since the discs are made of a flexible thermoplastic material, as the lifter 177 moves the discs upwardly, the outer edges of the discs will yield as they bear against the lower surfaces of members 192 and 193 to allow the discs to be positioned in the entrance portions of the guide tracks.

The transfer conveyor 170 is supported from above at the punching mechanism by a bracket 195 secured to frame member 162 and a horizontally disposed support member 196 attached to the top of bracket 195 by means of bolts 196a, which are threaded therethrough and into a bored cylindrical spacer block 197. Bolts 197a are threaded through guide tracks 190 and 191 into spacer 197, and cooperate with bolts 196a to position the bore in spacer 197 in axial alignment with bores 161a and 164a.

To assure that the discs are not lifted past recesses 190a and 191a, a stop member 201 is positioned in the bore of spacer 197 directly above and in line with the center line of lifter 177. Stop 201 is secured to the lower end of a shaft 201a by a screw 202, and shaft 201a extends upwardly through bracket 195 and is slidably mounted therein by bushing 202. Bushing 202 is provided with mounting flange 202a which engages the surface of the horizontal portion of bracket 195, and a collar 202b, secured to bushing 202 as by screws (not shown) supports the bushing on the upper surface of bracket 195. A compression spring 203 is disposed between the lower flange 202a of bushing 202 and the upper surface of stop member 201 to bias the stop member downwardly to return it to its lowermost position.

Figure 2:
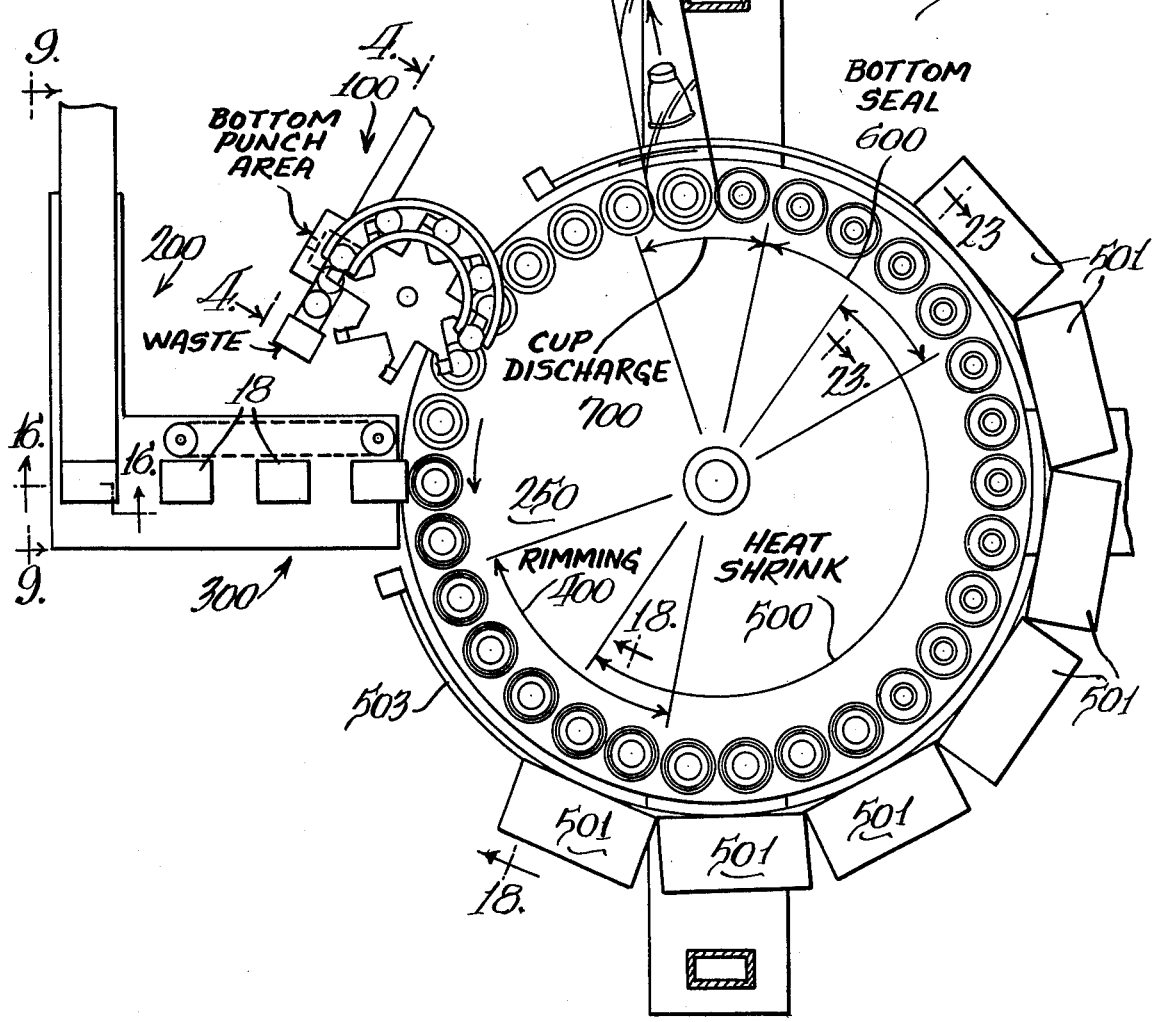
FIG. 2 is a schematic plan view of the apparatus shown in FIG. 1.

The discs are supported on the support surface of members 192 and 193 within recesses 190a and 191a once lifter 177 is retracted, and the discs are moved along the guide tracks in a clockwise direction, as viewed from above in FIG. 2, to a disc discharge location above the path of mandrels 21. The inner track assembly comprised of members 190 and 192, is supported at the disc discharge end of conveyor 170 by a mounting block 204, FIG. 8, which is secured to the lower surface of support member 196, by bolts 204a. The inner track assemblies 190 and 192 are secured to the lower surface of blade 204 by bolts 189. The outer guide track assembly comprised of members 191 and 193 is supported at the disc discharge end of conveyor 170 from the inner track 190 by means of a cross brace member 204b, extending transversely therebetween.

The discs are moved along the recesses by a star-shaped wheel 171 which is provided with upwardly extending, inverted, L-shaped disc engaging fingers 205 positioned at the end of each of the shapes of wheel 171 at the elevation of recesses 190a and 191a. The upstream vertical surface 206 of fingers 205 is formed with an arcuate surface complementary to the shape of the bottom discs and is designed to engage the downstream portion of the discs, as illustrated in FIG. 8 to transfer them along the guide track assemblies. Start wheel 171 is keyed to a vertically disposed shaft 205, which is rotatably supported at its lower portion and midportion by bearings 208 which extend outwardly from side frame member 127. The upper end of shaft 205 is rotatably supported in member 196 by a bushing 206, which is retained in place by a flange 206a which engages the lower surface of member 196. The top of shaft 205 is provided with a ring spacer and bolt 207 which engages the top of bushing 206. Shaft 205 extends below the elevation of shaft 126 and is provided with a bevel gear 209 at its lower end. Power input to the shaft 205 is provided from gear 210 on shaft 126 which drives a horizontal transfer shaft 211, mounted between side frame members 127 by bearings 212, through a spur gear 213. Shaft 211 drives bevel gear 209 by means of a meshing bevel gear 214 at the end of shaft 211 to provide timed drive between star wheel 171 and the other bottom disc cutting station mechanisms.

The discs are transferred from the recesses to the tops of the mandrels by means of a rotating wheel 215, FIG. 8, which has diametrically opposed laterally extending fingers 215a. Wheel 215 is mounted on a drive shaft 216 which is supported in block 204 by bearings 216a at an elevation above the path of the discs. Shaft 216 is driven from vertical shaft 205 by a bevel gear 218 on the opposite end of shaft 216 which meshes with a bevel gear 217 on the upper end of shaft 205. Fingers 215 are designed to extend below the elevation of the discs carried in the guide track assemblies and are rotated in timed relationship with the movement of the discs so that the ends of fingers 215a engage the center of the discs, as illustrated in FIG. 6, and cause the discs to be flexed downwardly. The flexing of the discs causes the edges of the discs to yield and be disengaged from the conveyor recesses and thereby allow the discs to be transferred to the recesses in the tops of the mandrels.

SIDEWALL WEB HANDLING AND FORMING MECHANISM

As described above, cylindrical sleeves are formed from a continuous thermoplastic web 220 (FIGS. 1 and 9), which is supplied from a spool mounted roll 221 and unwound therefrom by unwinding roller means 225 which forms the web into a supply loop 220a. Web 220 is fed into a cutting mechanism 226 by a pull roller means 227, and the web is directed about a winding roller assembly 228 by feed roller means 229 positioned between cutting mechanism 226 and winding roller assembly 228. The decorated surface, if any, of the web 220 is on the upper outwardly facing surface of the web.

Referring to FIGS. 3 and 10, the power input for the sidewall web handling apparatus is provided from previously mentioned shaft 37 through gear 230 thereon which meshes with a transfer gear 231 at one end of a shaft 232 that is parallel with shaft 37. A gear 233 at the opposite end of shaft 232 provides power input to winding roller assembly 228 (as will be described in greater detail below) and also provides drive to the web handling mechanisms through a series of intermeshing gears including gears 234, 235, 236, and 237. Gear 236 is keyed to shaft 241 which extends transversely to the path of the web to provide power input to unwinding roller means 225 through gear 242 on shaft 241, transfer drive 243 including gear 244 on shaft 245 which meshes with gear 242, sprocket 246 on shaft 245 and drive chain 247; power input to the sleeve transfer conveyor 300 (to be described in greater detail below) by a bevel gear 248 at one end of shaft 241; power input to pull roller means 227 through a gear train including gear 239a at the end of shaft 241 opposite from gear 248, transfer gear 239b and driven gear 239c which provides power input to a control device for driving pull roller means 227, to be described below.

The web 220 is directed beneath a guide roller 249 rotatably mounted on housing 260 by shaft 249a (FIG. 11) to the unwinding means 225. The web is unsupported between unwinding roller means 225 and pull roller means 227 to form a loop 220a which extends between a pair of photoelectric sensors 253 which control the length of the supply loop, as will be described below.

Referring to FIGS. 12 and 12a, unwinding roller means 225 includes two generally cylindrical shaped rollers 251 and 252 disposed in vertical alignment within a box-shaped housing 260. Lower roller 251 is mounted in housing 260 by means of bearings 261 at each end. Shaft portions 251a and 251b extend outwardly from the ends of roller 251 and mount drive gears 263 thereon. Power input is provided to the roller 251 by a sprocket 264, mounted on shaft 251b outboard of gear 263, which receives power input from chain 247.

Upper unwinding roller 252 is also provided with end shafts 252a and 252b. Roller 252 is mounted by bearings 269a on end shafts 252a and 252b in vertically movable slide blocks 265. Slide blocks 265 are positioned in quideway 266 in the side of housing 260 and engage the vertical outer side portions by means of integral vertical flanges 265a. Slide blocks 265 are interconnected at their upper surfaces by a plate 267 and bolts 268. Shafts 252a and 252b extend outwardly to mount gears 270 which mesh with gears 263 to provide rotation of roller 252. The upper roller 252 is biased downwardly by means of compression springs 271 disposed between the upper surface of plate 267 and adjustment studs 272 extending downwardly from the top portion of housing 260. In addition, the upper roller is resiliently biased while in engagement with the lower roller by means of springs 265b, positioned in vertical bores 265c in each side block. Springs 265b are secured at their lower ends to bolts 265d which are threaded through a shim 265e and into housing 260, and the upper end of the springs bear against the top surface of bores 265c.

As indicated above, sensing devices 253 control the length of the supply loop 220a in similar fashion to the bottom disc web loop, and to this end, an air cylinder 273 is mounted to the top portion of housing 260 and the piston rod 273a thereof extends downwardly through the top of housing 260 and is attached to the upper surface of plate 267 to raise and lower the top roller in response to input from photocells 253.

The supply loop 220a is directed upwardly along a generally vertically disposed, frame mounted guide plate 280 (FIGS. 9 and 10) about a horizontally disposed idler roller 281 and into the nip of pull roller means 227. The pull roller means 227 is similar in construction to the unwinding roller means and corresponding parts are similarly numbered with a primed number. It should be noted that unlike the unwinding roller means, the pull roller means receive power input from a driven gear 282 mounted on shaft 251b' outboard of gear 263'. The unwinding roller means feeds the web along a horizontal support member 308 which supports the web as it is conveyed to cutter mechanism 226.

Since the sidewall of containers formed according to the present invention are very often provided with a repetitive decorative surface, pull feed roller means 227 is designed to adjust the feed timing of the web to the cutter mechanism. To this end, a sensing head 285, FIG. 11, is positioned above the path of the web stock and is designed to read indicia which is printed on the decorative surface of the web to control the timed advancement thereof. Sensing head 285 controls a variable speed transmission drive unit 286, FIG. 10, which drives gear 282 through a series of transfer gears 287, 288, and 289. Power input is provided to drive unit 286 from shaft 286a which is driven by gear 239c, FIG. 10. Sensing head 285 and unit 286, which are commercially available, in essence provide a feedback control system for adjusting the advancement of the web by the pull rollers 227 to assure that the decorative pattern on the sidewall is maintained in timed relationship with the cutter mechanism, as is well known to those skilled in the art.

The cutter mechanism 226 is driven by transfer gear 237, which meshes with driven gear 290 on a shaft 291 that extends from roller 292 to drive the upper roller and cutter blade 292, FIG. 10. The cutter assembly 226, FIGS. 13 and 13a comprises an upper roller 292, which mounts an adjustable cutter blade 292' in a longitudinally extending recess 292c, as by bolts 292d, and a lower bearing roller 293 which cooperates with the working edge of the blade to sever rectangular blank 16 from the stock web 220.

The cutter mechanism rollers 292 and 293 are mounted in vertical alignment in the side portions of a box-shaped housing 294 by means of bearings 295, seals 296, and lock nuts 297 on end shafts of each of the rollers. Cover members 301a and 301b are provided to enclose the bearings to prevent contamination thereof, and seals 302 are provided on the end shafts. Cover members 301a and 301b are secured to the sides of the housing as by bolts 303. The bearing cylinder 293 is driven by upper roller 292 by means of end mounted gears 305 of roller 292 and 306 of roller 293 outboard of cover 301b to provide timed rotation therebetween.

The stock web 202 is supported on the input end of the cutter mechanism by guide member 308 and a second horizontal guide member 309 spaced downstream of the cutter mechanisms at the same elevation as guide 308 receives cut blanks 16 from the cutter assembly and directs them into the nip of the rollers at the feed assembly 229. The bearing roller 293 is mounted such that the upper surface is at the elevation of the bottom surface of the web and projects through the space between guide member 308 and 309. The surface of the upper roller 292 is out of contact with the web as it is fed through the cutter mechanism.

The feed roller assembly 229, which directs rectangular blank 16 to the winding mechanism 228, comprises two vertically disposed rollers 310 and 311, FIG. 9, which are mounted in a box-shaped housing similar to the other roller assemblies utilized in this invention. The feed roller assembly 229 is spaced from the cutter mechanisms 226 a distance less than the length of a blank 16 so that the leading end of the web is received by the feed roller assembly before a blank is severed from the web. Lower roller 311 receives power input from an end mounted gear 312 which is driven by a gear train including transfer gear 313, gear 314 at the end of shaft 315, gear 316 at the other end of shaft 315 which is driven by shaft 241 through gear 317 to provide conjoint timed rotation of the feed rollers with the other mechanism of the machine, FIG. 10.

Lower roller 311 is mounted in the housing by means of bearings (not shown). Upper roller 310 is mounted in vertically movable slide blocks 318, FIG. 11, which are biased downwardly by a compression spring 319 disposed between the slide blocks 318 and adjustment studs 320 in the top of housing 317 to bias the upper roller into engagement with the lower roller 311. Since the feed rollers 229 are designed for continuous rotation, the upper roller is in continuous engagement with the lower roller to rapidly transfer blanks 16 from the cutter mechanism to the winding mechanism 228. The blanks are advanced horizontally along a guide member 321 which directs the cut blanks 16 onto the winding apparatus 228, described in greater detail below.

Power input to the winding mechanism is provided from gear 233, FIGS. 10 and 14, by an eccentrically positioned connecting rod 325 which is pivotally connected at its lower end to gear 233 by pin 325a and at its upper end to a rack gear 327 by pin 328 and bracket 329. Rack gear 327 is constrained for vertical movement by means of a housing 330 fixedly attached to frame member 240 as by bolts 331. Rack gear 327 meshes with a frame mounted gear 332 which in turn drives a coaxially mounted gear 333 to drive the unwinding roller gear 334, FIGS. 10 and 15.

The winding mechanism 228 may be best understood by reference to FIGS. 14 and 16. The winding mechanism includes a cylindrically shaped support member 335 (FIG. 16) which is disposed transversely below the path of the rectangular blank 16 and is mounted to frame member 240 (FIG. 14) by means of an L-shaped bracket 336. Support member 335 is fixedly positioned in bracket 336 by means of a key 337 (FIG. 16). Driven gear 334 is rotatably mounted about support member 335 by means of a bearing 338. Bearing 338 is spaced from bracket 336 by means of a spacer 339 positioned therebetween.

A generally cylindrically shaped wrapping member 340 having an inner diameter slightly larger than support member 335 is positioned coaxially thereon. The end of the wrapping member adjacent gear 334 is provided with an outwardly extending flange 341 which is utilized to connect the wrapping member to the gear, as by bolts 342, so that as gear 334 is rotated, the wrapping mandrel is rotated conjointly therewith.

The rectangular blanks 16 are formed into a cylindrical sleeve by the rotation of the wrapping member 340 and the use of vacuum to hold the leading edge of the rectangular blank on the wrapping mandrel during its rotation. To this end, vacuum is supplied to the surface of the wrapping member 340 by means of a plurality of longitudinally spaced apart vacuum ports 343, which communicate with an annular chamber 343a between wrapping member 340 and support member 335. The wrapping member is mounted in air-tight relationship with support member 335 by means of gaskets 346 and 347. Vacuum is supplied to this annular chamber through a longitudinally extending central passageway 344 and radially extending passageways 345 within support member 335.

Vacuum is supplied to central passage 344 from a suitable vacuum source by means of a slide mechanism 350 which may be best understood by reference to FIGS. 14, 14a and 14b. Support member 335 extends outwardly of bracket 336 and is secured therein by a mounting collar 348, FIG. 14b. Passage 344 opens outwardly at the end of support member 335 and is enclosed by housing 351 which is provided with a vacuum slot 352 in the vertical surface thereof that communicates with passage 344. A slide housing 353 is mounted outboard of housing 351 and housings 351 and 353 are secured to bracket 336 as by bolts 354. Housing 353 includes a passage 353a, and a slide block 355 is slidably positioned in passage 353a. Slide block 355 is provided with a passageway 356 which may be aligned with slot 352 to allow vacuum to be applied to passage 344 from vacuum tubing 357' which communicates with passage 356.

A connecting rod 360 is attached to the lower end of slide 355 and extends downwardly to mount a cam follower 361, FIG. 14, at its lower end. A yoke 362 is mounted outboard of follower 361 and is slidably secured to frame mounted shaft 363 by means of a slide block 364 at the end of shaft 363. Rod 360 is constrained for vertical movement by a U-shaped bracket 365 which is secured to the frame by means of a bracket 366. The follower 361 and rod 360 are biased into resilient engagement with a cam 367 on shaft 363 by means of compression spring 368 disposed between an adjustable collar 369 on rod 360 and bracket 365, and a second compression spring 370 disposed between yoke 362 and the lower portion of bracket 365. Cam 367 is rotated by a coaxially mounted gear 372 to provide timed rotation between the vacuum slide 355 and the other mechanisms of the sidewall handling apparatus.

Rectangular blanks 16 are wrapped by the wrapping member in the following sequence: the wrapping member 340 is initially positioned with vacuum ports 343 facing downwardly due to the oscillatory motion of gear 334; a blank 16 is fed into position with the leading edge thereof above the wrapping member and beneath a resiliently mounted holding wheel 375 by feed roller assembly 229, the blank being supported on guide 321, and as the wrapping member is rotated 180° to present the vacuum ports 343 in abutting relationship to the leading edge of the rectangular blank, rod 360 is raised to direct vacuum into central port 344 so that the leading edge of the blank is affixed to the wrapping member, the suction generated on the blank being sufficient to assure that the blank is affixed to the wrapping member so that there is no slipping therebetween as the blank is affixed and wrapped; and the wrapping mandrel is then rotated 360° to present the trailing edge of the blank in overlying relationship with the leading edge and beneath the holding wheel 375 which resiliently retains the overlapping ends of the blank against one another, at which time the rod 360 is lowered terminating vacuum to ports 343. Holding wheel 375 is rotatable in a direction longitudinally to the wrapping member to permit the sleeve to pass freely therebeneath when the sleeve is shifted axially of the member 340. After the blank has been wrapped into a cylindrical sleeve, an annular stripper sleeve 376, mounted concentrically about wrapping member 340, is moved longitudinally to cause the sleeve to be transferred axially along the wrapping member, as indicated in phantom line on FIG. 16. As the blank is stripped, the wrapping mandrel is rotated back 540° to present it in position for a following blank.

Referring to FIGS. 16 and 17, stripper 376 is provided with a generally L-shaped mounting bracket 377 at the lower portion thereof, and bracket 377 is connected to an upper plate portion 378a of a trolley assembly 378 by bolts 379. Upper member 378a is located above a horizontal frame member 381 below the wrapping member, and is connected by bolts 382 to two downwardly extending side portions 378b, which project downwardly through slots 380 in horizontal frame member 381. A horizontal lower portion 378c of the trolley assembly is joined at each side to the side members by bolts 383. A contoured track 384 is secured on the lower surface of frame member 381 within guide housing 378 and the inner surface of the bottom portion 378c is formed with a complementary surface to engage the track.

Timed reciprocation of the stripper 376 is provided from previously mentioned bevel gear 248, FIG. 15, which drives a bevel gear 385 on frame mounted shaft 386. An eccentric cam plate 387 is fixed to shaft 386 and provided reciprocal movement of trolley 378 through a rocker arm assembly 388, having a laterally extending cam follower 388a riding in the internal track of cam 387 at one end and a connecting rod 389 pivotally attached to the other end of the rocker arm at one end and to the bottom of housing 378 at its other end. Thus as cam 387 is rotated, stripper 376 is reciprocated longitudinally along wrapping member 340 to transfer wrapped sleeves longitudinally thereof.

The end portion of member 335 beyond wrapping member 240 has an enlarged diameter corresponding to the diameter of the wrapping member. End portion 402 is provided with a longitudinally extending vertical access slot 402d for mounting roller sets 400, 405 and 410. Roller set 400 adapted to enage the edge portions of the blank therebetween includes an inner idler roller 401 having a convex outer surface and which is rotatably mounted within support 402 by shaft 402a, and an upper roller 403 driven by frame mounted shaft 404. The working surface of roller 403 is concave and eccentrically tapered to produce a bearing surface 403a which engages a sleeve adjacent and inwardly of the trailing (overlying) edge portion, so that the trailing edge portion may be lifted out of engagement with the underlying end portion when hot air is directed therebetween, as discussed below.

Roller set 405 is adapted to engage the sleeve diametrically opposite the overlapping edge portions, and includes an inner idler roller 406 having a convex working surface, which is rotatably mounted in support 402 by shaft 406a, and a driven outer roller 407 mounted on shaft 408. Roller 407 is concave and engages the surface of roller 406 to cause roller 406 to be driven conjointly therewith.

As the stripper 376 reaches the end of its stroke, the sleeve moves into the nip between roller sets 400 and 405, which take over the axial feeding of the sleeve. As the sleeve is being received by roller sets 400 and 405, hot air is directed between the edge portions of the sleeve from a flattened nozzle 409 positioned downstream from roller 403. The air stream causes the trailing edge portion to be separated from the underlying end portion and form a pocket and thus allow the thermoplastic material to soften and be placed in a condition for sealing. The above described configuration of roller 403 enables the trailing edge to be easily lifted by the stream of hot air, with the result that the facing surface of both end portions of the sleeve become softened. The hot air from nozzle 409 should be in the range of 775° - 825°, preferably around 800°, to provide proper softening of the edge portions. To prevent support member 402 from becoming overheated, nozzle 409 may be mounted on means (not shown) to allow the discharge therefrom to be directed away from support 402 when no sleeve is present thereon.

Roller set 410 is spaced longitudinally from roller set 400 at the end of support 402, and includes an outer roller 411 mounted on shaft 412 and an inner roller 413 rotatably mounted on support 402 by shaft 414. Roller 411 has a concave working surface positioned in sleeve compressing relationship with the adjacent convex working surface of roller 411. Roller set 410 is spaced longitudinally from roller sets 400 and 405 by a distance less than the height (longitudinal dimension) of the cylindrical sleeve, so that the leading end thereof is received by roller set 410 before the trailing end is released by roller set 400 and 405. As indicated, the overlapping edge portions of the cylindrical sleeve are softened by hot air from nozzle 409 and roller set 410 is designed to compress and form a longitudinal, liquid-tight lap joint type seam therebetween.

The rollers 403, 408 and 411 are driven by a chain drive 420, FIG. 15, which is driven from shaft 386 by gear 421 at the end thereof. Gear 421 drives a driven gear 422 on a frame mounted stub shaft to provide power input to a drive sprocket 423 attached to the gear. Drive sprocket 423 drives an endless chain 424 which encompasses sprockets 425 on shaft 412, sprocket 426 on shaft 404, sprocket 427 on shaft 408 and an idler sprocket 428 on a frame mounted stub shaft (not shown).

CYLINDRICAL SLEEVE TRANSFER MECHANISM

After the cylindrical sleeves 18, shown in phantom in FIG. 15, have been seamed, they are transferred longitudinally onto a frame mounted, generally U-shaped guide trough 430 mounted to the machine frame at the output end of support 402 and below the elevation of the bottom thereof. Guide trough 430 extends longitudinally from the output of the wrapping section to the path of the mandrels on the turret.

The cylindrical sleeves 18 are transferred along support 430 by means of an endless chain 431 extending longitudinally along one side thereof, which carries a plurality of spaced apart transfer fingers 432 that engage the downstream portion of the cylindrical sleeves to transfer them along member 430.

One end of chain 431 is carried on a sprocket 433 which is positioned upstream of the seaming rollers 410 so that the fingers 432 may be brought into engagement with the cylindrical sleeves prior to their release by the seaming rollers. A cut-out 434a (FIG. 15) is provided in the bottom of support 402 to permit the passage of fingers therethrough. The other end of chain 431 passes around a drive sprocket 435 at the outlet end of the transfer conveyor. Sprocket 435 receives power inlet from shaft 386 by means of bevel gear 436 on shaft 386 and bevel gear 437 on one end of a perpendicular shaft 438. Shaft 438 is provided with a bevel gear 439 at its opposite end which drives an intermediate bevel gear 440 on a hollow shaft 441, (to be described in greater detail below) and bevel gear 440 in turn drives a bevel gear 442 which is connected to sprocket 435 by means of a vertical shaft 443.

The cylindrical sleeves 18 are supported longitudinally at the side opposite the chain 432 by means of an elongated guide bar 450 supported from the frame by brackets 451, and which is adapted to bear against the side of the cylindrical sleeves as they are moved along the guide trough 430.

The cylindrical sleeves 18 are reoriented from a horizontal to an upright position at the end of guide trough 430 by means of a rotating vacuum pickup wheel 460 positioned below the outlet end of the guide trough. Wheel 460 is rotatable on hollow shaft 441 and in sealing engagement therewith. Wheel 460 is rotated by means of intermediate bevel gear 440 to which it is fixedly attached. A plurality of outwardly extending vacuum pickup members 462 are provided on wheel 460. Vacuum from a suitable source is supplied to a vacuum disc 460a in sealing engagement with the side of wheel 460 opposite bevel gear 440, by means of the passageway within axle 441, which receives vacuum through tubing and fittings 463. Vacuum disc 460a has an arcuate shaped chamber 460b (shown in phantom line on FIG. 15) in its face abutting wheel 460 which is in communication with the vacuum source. The arcuate chamber corresponds to the arc through which the sleeves 18 are to be carried for placement on the mandrels. An atmosphere port 460c is provided downstream and on a common radius with the arcuate chamber. Each pickup member 462 is hollow and in communication with a passageway in wheel 460 which is opened to the surface of wheel 460 abutting disc 460a and on a common radius with the chamber and port. In this manner, vacuum is supplied to each pickup member as it engages a sleeve and vacuum continues to be applied until the sleeve is about the mandrel, at which time vacuum is terminated and the passageway is exposed to atmosphere through port 460c to release the sleeve.

Pickup members 462 are of sufficient length so that as they are rotated in the direction of sleeve transfer, in timed relationship with the movement of the cylindrical sleeves along guide 430, the pickup members are presented in engagement with the sidewall of the sleeves and the sleeves are affixed thereto by means of vacuum in the manner just described. The sleeve engaging surface 462a of the pickup members is contoured to the configuration of the sleeve so that the sleeve is supported thereon during rotation.

Guide trough 430 is provided with a generally rectangular cut-out 430a at the free end thereof to allow the pickup members 462 to be rotated into engagement with the cylindrical sleeves prior to their release at the outlet end of guide 430. Since the drive to all the components of the apparatus are interrelated and synchronized, the cylindrical sleeves 18 are transferred about the forming mandrels carried on the turret in an upright position as indicated on FIG. 15.

Once a cylindrical sleeve 18 has been positioned about a forming mandrel 21, the remaining operations to be performed on the sleeve and bottom closure disc are done in cooperation with the forming mandrels. Prior to the production of containers, the forming mandrels 21 are preheated to avoid chilling of the interior surface of the sleeve during the shrinking operation which would, of course, inhibit shrinking. It has been found desirable that the mandrels be at an elevated temperature, but not higher that the softening point of the thermoplastic material from which the sleeve is formed. Additionally, the rimming die 42 must be heated to facilitate the formation of a rim on the containers. To this end, a plurality of heat sources 501 are provided about the periphery of the turret at the elevation of the path of the forming member 41 ("7-1 O'clock"), FIG. 2. The heat sources 501 are mounted by brackets 502 (FIG. 18) which extend upwardly from the base 29 of the machine. Preferably, these heat sources are in the form of infrared heating elements which direct radiant energy against the surfaces of the forming portion 41 so as to maintain the surface temperature thereof in the order from about 150° to 170° F. Additionally, heater means in the form of a calrod heater 503 is also mounted on brackets 502 at the elevation of block 45 and extend approximately 270° about the turret ("8:30–11 O'clock" position) on FIg. 2. By utilizing these heater means, the apparatus may be run through several cycles before web stock is provided to initially preheat the mandrels and forming dies.

TAMPING AND RIMMING OPERATIONS

The operation of the turret and its associated mechanisms may be best understood by reference to the timing diagram shown in FIG. 22. In the diagrams shown in FIG. 22, the 0° mark corresponds to the "9 O'clock" position in FIG. 2. After a cylindrical sleeve 18 has been deposited on a mandrel, the sleeve is tamped downwardly about the forming portion 41 by means of an overhead, generally disc-shaped tamping plate 510, which has a tapered projection 510a extending downwardly from a horizontal flange 510b, it being understood that there is one such plate 510 for each mandrel. Flange 510b has a diameter greater than the diameter of the upper portion of sleeve 18, as illustrated in FIG. 20, and the tapered projection 510a has a major diameter approximately equal to the inner diameter of the sleeve 18 so that as the plate 510 is lowered downwardly, the sleeve is forced downwardly relative to forming portion 41, to positively seat the lower end of the sleeve in arcuate recess 42. It will be appreciated that if any sleeves are askew on a mandrel, projection 510a will function as a camming member to align the sleeve axially of the mandrel.

Plates 510 are each mounted by means of a bearing assembly (discussed below) to the lower end of an S-shaped connecting member 511 which is attached to a control assembly 512 by means of bolts 513. Control assemblies 512 provide two modes of movement for plate 510, viz. an up and down reciprocation, and a horizontal rotation to move the plate in and out of alignment with its forming mandrel. Control assemblies 512 are carried on a turret 515, FIG. 19, having a diametrically extending reinforcing flange 516 on its lower surface and which is fixedly secured to shaft 26 by means of collar 517 and bolts 518 for conjoint rotation therewith. A plurality of radially extending brackets 520 are mounted at circumferentially spaced locations around the periphery of turret 515 by bolts 521. Two vertically spaced, outwardly facing journal mounts 522 are provided on each bracket, and a vertically disposed control rod 524 is supported in journal mounts 522 by means of bushings 523. The lower end of each control rod is attached to the upper end of one of the S-shaped brackets 511 by bolts 513, and the upper end of each control rod is provided with a generally L-shaped follower assembly 525 above the upper journal amount. Assembly 525 is provided with an upwardly facing, pivotally attached cam follower 526 which is utilized to pivot the control rods about their vertical axis and to move plates 510 into and out of alignment with their forming mandrels.

Referring to FIg. 1, a control cam 527 is secured to the lower surfaces of cross members 29b and provides a downward facing cam track 527a at its lower surface in which follower 526 rides. Cam 527 is designed to rotate plate 510 out of alignment with its respective mandrel when the bottom disc closure 16 and cylindrical sleeve 18 are deposited thereon, and when the finished container is removed from the mandrel, since it will be appreciated that plate 510 would otherwise obstruct the access to the forming mandrels. The operation of cam 527 may be more readily understood by reference to the timing diagram of FIG. 22 which illustrates that plate 510 is swung into alignment with its respective forming mandrel from about 2° to about 10° of rotation of the shaft 26, remains in alignment therewith until about 260° at which time it is swung outwardly to allow the finished container to be removed from the mandrels and remains out of alignment with its respective mandrel until after the cylindrical sleeve has been deposited thereon. As illustrated in FIG. 1, cam 527 is contoured to assure that follower 526 remains in contact therewith while the control assembly is reciprocated upwardly and downwardly.

Control assemblies 512 are moved upwardly and downwardly by means of an L-shaped crank 530, which is pivotally attached at its apex to a stub shaft 529 extending laterally from bracket 520 by means of a spring clip 532. The generally horizontal leg 530a of crank 530 is pivotally attached to a sleeve-like yoke 531, which is slidably positioned on the upper portion of rod 524 below the upper journal mount. The free end portion of leg 530a is bifurcated, and inwardly facing pivot pins 532 on the legs of the bifurcated end portion extend inwardly into an annular recess 531a in the side of yoke 531. A collar 533 is fixed on rod 524 below the upper journal mount to provide a fixed stop against which yoke 531 may bear.

A compression spring 540 is disposed between the lower surface of yoke 531 and a spring seat member 541 is fixed to an intermediate portion of rod 524 in engagement with the upper surface of a shoulder portion 524a. Spring 540 biases yoke 531 upwardly toward stop 533, and also provides a yieldable connection enabling leg 530a to move rod 524 downwardly. Member 541 is provided with an inwardly facing arm 543 which is engageable with the vertical outwardly facing surface of bracket 520 to define a fixed stop relationship for accurately axially locating plate 510 above the mandrel. A torque is applied to member 541 to bias arm 543 against bracket 520, and to this end, an attachment rod 545 is connected at one end to the lower end of member 541 and at the other end to bracket 520 by means of a spring 546 and bolt 547.

The upwardly facing arm 530b of lever 530 is provided with a cam follower 535 which rides in a cam track 536a of a horizontally disposed cam plate 536. Cam plate 536 is supported from cross members 29b above turret 515 by means of vertically extending brackets 537, FIG. 19. The cam profile of cam 536 may be best illustrated by the timing diagram in FIG. 22, discussed in greater detail below.

After a cylindrical sleeve has been placed on its forming mandrels 21, the tamping plate 510 is moved into alignment therewith and reciprocated downwardly into engagement with the upper end of the sleeve to force the sleeve downwardly about the forming portion 41 and into the concave die 42. Since the forming mandrels are continuously rotated, it will be appreciated that plate 510 must also rotate to avoid creating a torsion effect in the sidewall, and to this end, plate 510 is mounted to S-shaped bracket 511 by means of a bearing assembly 550, FIG. 23, which allows the plate to be rotated by sleeve 18 as the forming mandrel is rotated by gear 54 and bull gear 60.

With reference to FIG. 23, the lower horizontal portion 511a of connecting member 511 is provided with a shouldered vertical mounting hole 511b, in which a bearing 551 is positioned and supported on shoulder 511c. An annular disc 552 overlies the outer race of bearing 551 and is secured to the upper surface of portion 511a by bolts 552a. The upper surface of plate 510 is provided with a shouldered upwardly extending projection 510c which is positioned in mounting hole 511b to bear against the inner race of bearing 551. A circular bottom sealing die 625 (discussed below) includes an upwardly extending projection 625a that is secured within a central recess 510d in plate 510 by a threaded stud 533 that extends upwardly from projection 625a. An apertured disc 552 corresponding in diameter to the diameter of the inner race of bearing 551 is positioned on the upper surface thereof, and stud 553 projects through a central opening in disc 552, with a nut 544 being threaded thereon into engagement with the upper surface of disc 552. In this manner, plate 510 and die 625 are mounted for rotation relative to member 511.

As the cylindrical sleeve is forced downwardly into die 42, a complementary die 560, FIG. 18, is cammed into engagement with the upper surface of flange 42a to collectively provide a circular rimming die for formation of the rim.

Each die portion 560 is brought into engagement with die 42 by means of a rack and pinion pivot mechanism 561, FIG. 18. Mechanism 561 includes a vertically extending sleeve 562 which is positioned in a mounting hole 563 in turret 25 on a common radius inwardly of its respective mandrel 21. Sleeve 562 has an intermediate shoulder 562a seated upon the upper surface of turret 25 and secured thereto by bolts 564. A control rod 565 is slidably supported within sleeve 562 by means of a bearing 566 at the upper end of sleeve 562. Sleeve 562 includes an outwardly facing, U-shaped mounting bracket 570, FIG. 18b, at the elevation of die 42. A transversely extending shaft 572 is positioned between the bracket legs, and die portion 560 is mounted thereto by means of a lever 573 having a U-shaped bracket 573a at one end which is pivotally mounted upon shaft 572. A pinion gear 575 is fixedly attached to bracket 573a by means of pins 575a, and gear 575 is rotatably mounted on shaft 572. Sleeve 562 is provided with a cut-out 562b which permits pinion 575 to engage a rack gear formed on the outwardly facing portion of rod 565, so that as rod 565 is reciprocated, die portion 560 is moved into and out of engagement with die 42. An adjustable stop, in the form of bolt 580, extends vertically through lever 573 adjacent die portion 560 to bear against a flange 581 extending outwardly from bracket 570.

Rod 565 is provided with a constraining collar 585 at its upper end and a constraining collar 586 at its reduced diameter lower end. A cam follower assembly 590 is attached to the lower end of rod 565 below collar 586 by means of bolt 591, FIG. 18a. Follower assembly 590 includes a bushing 592 slidably positioned on the lower end of rod 565, to which is secured a downwardly facing L-shaped bracket 593. A cam follower roller 594 extends radially inwardly of the turret from the bracket 593, and is disposed within a cam track of a cam 595. The track of cam 595 is defined by a lower cam portion 595a, which is mounted on bull gear 60 by means of bolts 596, and an upper cam portion 595b which is mounted in overlying relationship with portion 595a by means of an L-shaped bracket 597 which is secured to bull gear 60 by means of bolts 598.

To provide resilient engagement between die portion 560 and die 42, a compression spring 601 is disposed between the lower surface of collar 586 and the upper surface of the horizontal portion of bracket 593, so that as cam follower assembly 590 is raised, spring 601 resiliently raises rod 565. The operation of cam 595 may be best understood with reference to FIG. 18a, and the rimming cam diagram of FIG. 22, which illustrates the cooperation between cam 595 and cam 536. With reference to the tamper motion diagram and rimming cam diagram on FIG. 22, it will be observed that as the tamping plate 510 is lowered downwardly into engagement with sleeve 18, cam 595a raises rod 565 to cause die portion 560 to be placed into engagement with die 42 on the rotating mandrel, and it will be appreciated that downward movement of the sleeve 18 into recess 42 initially causes the end of the sleeve to curl upwardly, whereupon it is deflected inwardly by die 560 to complete the rim.

The cam profiles of FIG. 22 illustrate a rimming sector of approximately 60° at the end of which the upper portion 595a of cam 595 lowers rod 565 to pivot die portion 560 out of engagement with the mandrel. At the same time, cam 536 raise the tamping plate 510 upwardly out of engagement with the cylindrical sleeve.

HEAT SHRINKING OPERATION

Still referring to FIG. 22 but with reference to the uppermost bar graph of the timing diagram, it will be seen that the mandrels carrying the sleeve and bottom discs are exposed to the radiant energy from heaters 501 during the latter part of the rimming operation and that the exposure continues for approximately 180° of rotation about the turret. During this time the radiant energy from heaters 501 cause the heat-shrinkable sleeve 18 to contract inwardly about mandrel forming portion 41 and thus assume the shape thereof. The upper portion of the sleeve 18 extending above the top of the mandrel is caused to turn inwardly in overlying relationship witht the bottom disc 16 carried on plate 57. At about 210° of rotation, the bottom disc is raised to the recessed position in the mandrel to be heated preparatory to sealing with the inturned positions, as discussed below.

With reference to FIGS. 20, 21, 22, and 23, during the end of the heat-shrinkable cycle, at approximately 200° the tamping plate 510 is lowered into engagement with the inturned portion of sleeve 18. Die 625 is brought into engagement with the outer surface of the closure disc which has been previously raised, and a liquid-tight seal is formed between the inturned portions of sleeve 18 and bottom disc closure 16 due to the pressure between die 625 and the disc support. Die 625 is shaped generally complementary with disc holding plate 57, and includes a plurality of annular ribs 625a, FIG. 23, to engage and seal the inturned portion of sleeve 18 to the bottom disc 16.

After the liquid-tight seal has been formed, plate 510 is raised upwardly out of engagement with the finished container and swung out of alignment therewith during the turret rotation sector of from approximately 258° to 281°. While the plate 510 is being swung out of alignment with the forming mandrel, the plate 57 remains in its elevated position. Once plate 510 is no longer obstructing removal of the finished container, cam 58 reaches a high portion at approximately 288° of turret rotation to free the finished container from the mandrel. At this time, the mandrels pass beneath a pneumatic tube 650 which draws the finished container off the mandrel by vacuum and carries it away for packaging. Cam 58 then lowers plate 57 into recess 44 and the entire operation is repeated.

Referring again to FIG. 22, after the finished container has been removed, a new bottom disc closure 16 is deposited in recess 44 at approximately 328° and a new cylindrical sleeve 18 is deposited thereon between approximately 358° and 2° of rotation of the turret. While the timing diagrams illustrated in FIG. 22 are illustrative of the preferred embodiment disclosed herein, it will be appreciated that variations of this timing diagram may be employed without the scope of this invention and therefore, these diagrams are to be considered as merely illustrative of a preferred embodiment of the invention.

We claim:

1. The method of forming a sheet blank of thermoplastic material into a sleeve comprising the steps of: affixing the leading end of said sheet blank to the exterior of a generally cylindrical shaped forming member; rotating said forming member to cause said sheet blank to be wrapped thereabout into a generally tubular shape with the trailing end portion of the sheet blank overlapping the leading end portion; transferring said tubular shape axially relative said forming member by applying pressure against an axial end thereof; directing air from a heating means toward said end portions to pneumatically lift said overlapping portion and to progressively heat soften the facing surfaces of said end portions as said tubular shape is axially transferred, concurrently maintaining unheated facing surfaces of said end portions in contacting relationship; and pressing said overlapping end portion against the other end portion to compress said softened surfaces to form a sleeve having a liquid-tight seam.

2. The method according to claim 1 wherein said affixing step is performed by supplying vacuum to the leading end portion of said sheet blank to cause it to be held on said forming member, said vacuum being terminated when said shape is transferred axially on said forming member.

3. The method according to claim 1 wherein said transferring and maintaining steps include the steps of feeding said end portions between the nip of a first set of rollers, the outer roller of said first set of rollers being tapered to engage the overlapping end portion at a spaced location from the end thereof, whereby said overlapping end portion is supported by the tapered surface of said outer roller as it is lifted, rotating said outer roller in the feed direction to transfer said tubular shape; directing said end portions between the nip of a second set of rollers having surfaces complementary to said tubular shape whereby said two rollers press said end portions together to form a seam; and driving one roller of said second set to transfer said sleeve.

* * * * *